(12) United States Patent
Tsuchiya et al.

(10) Patent No.: US 11,817,003 B2
(45) Date of Patent: *Nov. 14, 2023

(54) CONTENT PRESENTATION SYSTEM AND CONTENT PRESENTATION METHOD

(71) Applicant: Hitachi Systems, Ltd., Tokyo (JP)

(72) Inventors: Shintaro Tsuchiya, Tokyo (JP); Takayuki Fujiwara, Tokyo (JP); Kentarou Oonishi, Tokyo (JP); Katsuro Kikuchi, Tokyo (JP); Yoshihito Narita, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,560

(22) Filed: May 18, 2022

(65) Prior Publication Data
US 2022/0351641 A1   Nov. 3, 2022

Related U.S. Application Data

(63) Continuation of application No. 16/626,031, filed as application No. PCT/JP2018/031354 on Aug. 24, 2018, now Pat. No. 11,367,365.

(30) Foreign Application Priority Data

Jun. 29, 2018   (JP) .................. 2018-124690

(51) Int. Cl.
*G09B 19/00*   (2006.01)
*G06T 19/00*   (2011.01)
(Continued)

(52) U.S. Cl.
CPC ........ *G09B 19/0069* (2013.01); *G06T 19/006* (2013.01); *G06V 20/20* (2022.01); *G06V 40/103* (2022.01)

(58) Field of Classification Search
CPC .. G09B 19/0069; G06T 19/006; G06V 20/20; G06V 40/103
See application file for complete search history.

(56) References Cited

U.S. PATENT DOCUMENTS 8,914,472 B1 * 12/2014 Lee .................... G06Q 30/04
709/219
9,305,216 B1    4/2016 Mishra
(Continued)

FOREIGN PATENT DOCUMENTS

JP          2001-331216 A    11/2001

OTHER PUBLICATIONS

Henderson et al., "Augmented reality in the psychomotor phase of a procedural task", 2011 10th IEEE International Symposium on Mixed and Augmented Reality, Oct. 29, 2011.

*Primary Examiner* — Motilewa Good-Johnson
(74) *Attorney, Agent, or Firm* — Venable LLP; Henry J. Daley; Aziz H. Poonawalla

(57) ABSTRACT

A content presentation system includes: a trainee terminal that presents training content to the trainee; a worker terminal used by a worker; a tool recognition device that acquires a work video of the worker and recognizes the tool being used by the worker; a determination device that determines success or failure of the work at a specific stage based on the information about the work tool recognized by the tool recognition device; and a content creation device that creates and updates the training content based on the determination result of the determination device. When the determination result is determined to be the failure of the work by the determination device, the content creation device identifies a portion of the training content corresponding to the specific stage in the work procedure and updates the portion of the training content so as to suppress a factor of the failure.

7 Claims, 20 Drawing Sheets

(51) Int. Cl.
*G06V 20/20* (2022.01)
*G06V 40/10* (2022.01)

(56) References Cited

U.S. PATENT DOCUMENTS

| | | | |
|---|---|---|---|
| 9,566,004 B1 | 2/2017 | Radwin et al. | |
| 9,665,960 B1* | 5/2017 | Masters | G06F 3/0485 |
| 10,539,787 B2* | 1/2020 | Haddick | G06F 3/0428 |
| 10,755,134 B2 | 8/2020 | Matsuda et al. | |
| 10,860,100 B2* | 12/2020 | Osterhout | G06F 3/017 |
| 11,011,074 B2* | 5/2021 | Inoue | G09B 19/0069 |
| 11,216,656 B1 | 1/2022 | Zia et al. | |
| 11,227,439 B2* | 1/2022 | Bridgeman | G09B 5/02 |
| 11,367,365 B2* | 6/2022 | Tsuchiya | G06T 19/006 |
| 2003/0046401 A1 | 3/2003 | Abbott et al. | |
| 2010/0046791 A1* | 2/2010 | Glickman | G06V 10/25 |
| | | | 705/28 |
| 2012/0122062 A1 | 5/2012 | Yang et al. | |
| 2015/0185731 A1 | 7/2015 | Ham et al. | |
| 2015/0277416 A1 | 10/2015 | Nikovski et al. | |
| 2016/0077547 A1* | 3/2016 | Aimone | A61B 5/1114 |
| | | | 345/8 |
| 2016/0321948 A1* | 11/2016 | Adhikari | G16H 20/30 |
| 2016/0364913 A1 | 12/2016 | Montaigne et al. | |
| 2017/0148214 A1* | 5/2017 | Muniz-Simas | A61B 5/165 |
| 2017/0169561 A1* | 6/2017 | Mullins | G02B 27/0172 |
| 2017/0344919 A1 | 11/2017 | Chang et al. | |
| 2018/0293802 A1 | 10/2018 | Hendricks et al. | |
| 2019/0043385 A1* | 2/2019 | Inoue | G02B 27/0172 |
| 2019/0103033 A1 | 4/2019 | Lu Hill et al. | |
| 2020/0273365 A1 | 8/2020 | Wallace et al. | |
| 2020/0334851 A1 | 10/2020 | Hansson | |
| 2021/0173377 A1 | 6/2021 | Laftchiev et al. | |
| 2021/0335148 A1* | 10/2021 | Fujiwara | G09B 9/00 |
| 2021/0358327 A1* | 11/2021 | Tsuchiya | G06Q 50/04 |
| 2022/0051579 A1* | 2/2022 | Fujiwara | G09B 5/065 |

* cited by examiner

Work Operation Information Record Database (Worker Terminal)

| Worker No. | Observation Parts | Work No. | Procedure No. | Normal Operation No. | Video Record | Voice Record | Operation Conformity Level | Work Position Transition (x,y,z) →(x',y',z') | Work Time |
|---|---|---|---|---|---|---|---|---|---|
| 7034001 | Arm | 20180530001 | 1 | 102 | 20180530012301. mpeg | 20180530012301. mp3 | 90% | – | 30[s] |
| 7034001 | Wrist | 20180530001 | 2 | 102 | 20180530012401. mpeg | 20180530012302. mp3 | 70% | – | 30[s] |
| 7034001 | Arm | 20180530002 | 2 | 102 | 20180530012402. mpeg | 20180530012401. mp3 | 20% | (20,30,40) →(100,120,0) | 40[s] |
| 7034001 | Arm | 20180530002 | 3 | 102 | 20180530012501. mpeg | 20180530012501. mp3 | 90% | – | 40[s] |
| 7034002 | Wrist | 20180530002 | 1 | 103 | 20180530015501. mpeg | 20180530015501. mp3 | 90% | – | 30[s] |
| 7034002 | Leg | 20180530002 | 1 | 102 | 20180530015502. mpeg | 20180530015502. mp3 | 70% | – | 30[s] |
| 7034003 | Arm | 20180531001 | 2 | 104 | 2018053109201. mpeg | 2018053109201. mp3 | 60% | (0,0,40) →(10,20,0) | 40[s] |
| ... | ... | ... | ... | ... | ... | ... | ... | ... | ... |

FIG.7

Worker Information Record Database (Worker Terminal)

| Worker No. | Work No. | Procedure No. | Heat Rate | Blood Pressure | Body Temperature | Perspiration | Work Time |
|---|---|---|---|---|---|---|---|
| 7034001 | 20180530001 | 1 | 80bpm | 120 | 36.7 | Small | 30[s] |
| 7034001 | 20180530001 | 2 | 80bpm | 120 | 36.6 | Large | 30[s] |
| 7034001 | 20180530002 | 2 | 100bpm | 150 | 36.5 | Large | 40[s] |
| 7034001 | 20180530002 | 3 | 80bpm | 120 | 36.5 | Normal | 40[s] |
| 7034002 | 20180530002 | 1 | 90bpm | 140 | 37.7 | Normal | 30[s] |
| 7034002 | 20180530002 | 1 | 80bpm | 140 | 37.7 | Normal | 30[s] |
| 7034003 | 20180531001 | 2 | 80bpm | 120 | 35.7 | Normal | 40[s] |
| ... | ... | ... | ... | ... | ... | ... | ... |

FIG.8

Work Target Device Information Record Database (Worker Terminal)

| Worker No. | Observation Device | Work No. | Procedure No. | Normal Operation No. | Video Record | Voice Record | Operation Conformity Level | Model |
|---|---|---|---|---|---|---|---|---|
| 7034001 | Screw | 20180530001 | 1 | 102 | 20180530112301.mpeg | 20180530112301.mp3 | 90% | - |
| 7034001 | Wire | 20180530001 | 2 | 102 | 20180530112302.mpeg | 20180530112302.mp3 | 90% | - |
| 7034001 | Cover | 20180530002 | 3 | 102 | 20180530112401.mpeg | 20180530112401.mp3 | 20% | 20180530112401.obj |
| 7034002 | Handle | 20180530002 | 1 | 102 | 20180530115501.mpeg | 20180530115501.mp3 | 90% | - |
| 7034002 | Cover | 20180530002 | 1 | 103 | 20180530115502.mpeg | 20180530115502.mp3 | 90% | - |
| 7034003 | Keyboard | 20180531001 | 2 | 102 | 20180531109201.mpeg | 20180531109201.mp3 | 40% | 20180530112401.obj |
| ... | ... | ... | ... | ... | ... | ... | ... | ... |

FIG.9

Training Terminal Database (Trainee Terminal)

| Work No. | Target Device | Target Parts | Procedure No. | Dispaly Specification Definition No. | Disply Content | Work Video | Work Voice |
|---|---|---|---|---|---|---|---|
| 2018053 0001 | Screw | Arm | 1 | 1 | | | |
| 2018053 0001 | Wire | Wrist | 2 | – | Call Attention | 2018053012 301.mpeg | 2018053012 301.mp3 |
| 2018053 0001 | Wire | Wrist | 2 | 1 | Explanation | 2018053012 301.mpeg | 2018053012 301.mp3 |
| 2018053 0001 | Wire | Arm | 2 | – | Call Attention | 2018053012 301.mpeg | 2018053012 301.mp3 |
| 2018053 0001 | Wire | Arm | 2 | 1 | Explanation | 2018053012 301.mpeg | 2018053012 301.mp3 |
| 2018053 0001 | Cover | Arm | 3 | 1 | | | |
| 2018053 1001 | Keyboad | Arm | 2 | 1 | Explanation | 2018053109 201.mpeg | 2018053109 201.mp3 |
| ... | ... | | ... | | | ... | ... |

FIG.10

Work Analysis Result Database (System Management Server)

| Work No. | Target Device | Target Parts | Correction Procedure No. | Correction Target | Correction Category | Correction Content | Video Record | Voice Record | Work Position Transition | Model |
|---|---|---|---|---|---|---|---|---|---|---|
| 2018053 0001 | Wire | Wrist | 2 | Parts | Insert Before | Call Attention | 2018053012 301.mpeg | 2018053012 301.mp3 | (20,30,40) →(100,120,0) | – |
| 2018053 0001 | Wire | Arm | 2 | Parts | Insert Before | Call Attention | 2018053012 301.mpeg | 2018053012 301.mp3 | (20,30,40) →(100,120,0) | – |
| 2018053 1001 | Keyboard | Arm | 2 | Device | Change | Specification Change | 2018053109 201.mpeg | 2018053109 201.mp3 | – | 2018053012 401.obj |
| ... | ... | | | | | | | | ... | ... |

FIG.11

Training Content Database (Training Content Managemant Server)

| Work No. | Target Device | Target Parts | Procedure No. | Display Specification Definition No. | Display Content | Correction Content | Work Video | Work Voice | Work Position Transition | Model |
|---|---|---|---|---|---|---|---|---|---|---|
| 2018053 0001 | Screw | Arm | 1 | 1 | | | | | | |
| 2018053 0001 | Wire | Wrist | 2 | – | Call Attention | Call Attention | 20180530 12301.mpeg | 20180530 12301.mp3 | (20,30,40) →(100,120,0) | 20180530.obj |
| 2018053 0001 | Wire | Wrist | 2 | 1 | Explanation | Call Attention | 20180530 12301.mpeg | 20180530 12301.mp3 | (20,30,40) →(100,120,0) | 20180530.obj |
| 2018053 0001 | Wire | Arm | 2 | – | Call Attention | Call Attention | 20180530 12301.mpeg | 20180530 12301.mp3 | (20,30,40) →(100,120,0) | 20180530.obj |
| 2018053 0001 | Wire | Arm | 2 | 1 | Explanation | Call Attention | 20180530 12301.mpeg | 20180530 12301.mp3 | (20,30,40) →(100,120,0) | 20180530.obj |
| 2018053 0001 | Cover | Arm | 3 | 1 | Explanation | Specification Change | | | | |
| 2018053 1001 | Keyboard | Arm | 2 | 1 | Explanation | Specification Change | 20180531 09201.mpeg | 20180531 09201.mp3 | – | 20180531.obj |
| ... | | | | | | | | | | ... |

FIG.12

CONTENT PRESENTATION SYSTEM AND CONTENT PRESENTATION METHOD

CROSS-REFERENCE TO RELATED APPLICATIONS

This application is a continuation of U.S. application Ser. No. 16/626,031, filed Dec. 23, 2019, now allowed, which is a U.S. National Stage of PCT/JP2018/031354, filed Aug. 24, 2018, which claims benefit from Japanese Application No. 2018-124690, filed on Jun. 29, 2018, the entire content of which is incorporated herein by reference.

FIELD OF THE INVENTION

The present invention relates to a content presentation system and a content presentation method for presenting content to an on-site worker or trainee.

BACKGROUND ART

Before workers perform on-site maintenance/inspection work (on-site work), training is being carried out to allow workers to master the required skills and knowledge. Usually, training is conducted in a form of collective education in which instructors explain dangerous spots and points to be checked in the on-site work. In the training, the instructor may explain using the device that is actually the work target.

On the other hand, in the on-site work, various information such as work procedure information, work target device information, and information on the work tool to be used are required. A support system for providing the on-site workers with necessary information and supporting the on-site work is already known (see, for example, Patent Document 1).

Patent Document 1 discloses a system that comprehensively supports the on-site works, coping with abnormal situations, and training for the on-site workers. Specifically, the system is designed to perform the on-site work and training using databases that provide information to support the on-site works and information on abnormal situations assumed for the on-site work.

During the on-site work, unexpected accidents may occur or the work may fail. Accidents and work failures that occurred on the work site are fed back to the training site in reports and the like. Information on accidents and failures described in the report is accumulated in a database so that it can be utilized by the workers.

CITATION LIST

Patent Literature

[Patent Document 1] Japanese Unexamined Patent Application Publication No. 2001-331216

SUMMARY OF THE INVENTION

Technical Problem

However, in the conventional support system described in Patent Document 1, it has never been taken into consideration to efficiently reflect the failures or the like occurring in the on-site work to the training content. Further, in the conventional support system, when the specifications of the device installed in the work site and the work environment changed after creating the training contents, it took a lot of time to maintain the training content.

The present invention has been made to solve the above-described problems, and it is an object of the present invention to provide a content presentation system and a content presentation method capable of efficiently reflecting the failures and the like occurred in the on-site work to the training content and easily maintaining the training content.

Means to Solve the Problem

In order to achieve the above object, a content presentation system according to the present invention is a content presentation system (1) that presents a training content based on three-dimensional shape information of a work target device and a work procedure to a trainee (3), and presents the work procedure using augmented reality based on the three-dimensional shape information of the work target device, the content presentation system comprising: a first content output device (430) having a storage unit that stores the training content including the three-dimensional shape information of the work target device and evaluation reference information about work operation of the work procedure, and an output unit that outputs the training content so that the training content can be presented to the trainee; a second content output device (330) that presents the work procedure by the augmented reality based on the three-dimensional shape information of the work target device; an operation measurement device (117) that acquires a three-dimensional operation during a work of a worker (2) in a work site at least as measurement information of a body motion; a determination device (335) that determines success or failure of the work based on the evaluation reference information for evaluating the work operation based on the measurement information of the work operation; and a content creation device (340) that creates and updates the training content based on the measurement information of the work operation and the determination result of the determination device, wherein when a predetermined body motion of the worker is detected based on the measurement information from the operation measurement device, the determination device determines success or failure of the work based on the measurement information of the work operation of a specific stage during the work of a model worker up to the body motion, and when the determination result is determined to be the failure of the work by the determination device, the content creation device or the first content output device updates the training content so as to suppress a factor of the failure.

As described above, in the present content presentation system, the operation measurement device acquires the three-dimensional operation during the work of the worker in the work site at least as measurement information of the body motion and the determination device determines success or failure of the work based on the evaluation reference information for evaluating the work operation based on the measurement information of the work operation. And, when the work is determined to be the failure by the determination device, the content creation device updates the training content so as to suppress a factor of the failure. This means that the present content presentation system is a system that enables the work site and the training to cooperate efficiently and organically.

To be specific, when a predetermined body motion of the worker is detected based on the measurement information from the operation measurement device, the determination device determines success or failure of the work based on the measurement information of the work operation of a specific stage during the work of a model worker up to the body motion. And, when the determination result is determined to be the failure of the work by the determination device, the content creation device or the first content output device updates the training content so as to suppress a factor of the failure.

By this configuration, since the training content is updated so as to suppress the factor of failure when it is determined that the result of the determination is a failure of the work, the failure of the work such as an accident, a procedure mistake, a mistake of used tool and the like occurred in the site work (hereinafter collectively referred to as failure) can be efficiently reflected to the training content used in the training, thereby making it easy to maintain the training contents.

Further, the content presentation system of the present invention may be so configured that, the determination device compares the measurement information of the work by the worker according to the work procedure from the work operation measurement device with the measurement information of the work by the model worker, and determines a conformity level of the both work operations, and the content creation device or the first content output device updates the training content in accordance with the determination result of the determination device, so as to increase the conformity level.

By this configuration, it is possible to update the training content so that the trainee is effectively taught the work operation of the model worker.

Further, the content presentation system of the present invention may be so configured that, when the conformity level of the work operation in the specific stage is determined to be equal to or less than a predetermined value, the determination device determines whether or not the work has failed based on the measurement information including a three-dimensional transition of a specific part of the worker corresponding to the work operation in the specific stage and a work time.

By this configuration, it is possible to reliably detect the failure of the work of the worker, so that it can be efficiently reflected to the training content.

Further, the content presentation system of the present invention may be so constructed to further comprise a worker terminal (10) used by the worker and a management server (30, 40), wherein the operation measurement device is provided in said worker terminal, and the first content output device, the second content output device, the determination device, and the content creation device are respectively constituted by the management server which is connected to the worker terminal through a network.

By this configuration, even when the work site and the training site are remote from each other, it is possible to efficiently reflect the work failure of the worker to the training content.

Further, the content presentation method of the present invention is a content presentation method to present a training content based on three-dimensional shape information of a work target device and a work procedure to a trainee (3), and present the work procedure using augmented reality based on the three-dimensional shape information of the work target device, the content presentation method including: a first content output step to store the training content including the three-dimensional shape information of the work target device and evaluation reference information about work operation of the work procedure, and to output the training content so that the training content can be presented to the trainee; a second content output step to present the work procedure by the augmented reality based on the three-dimensional shape information of the work target device; an operation measurement step to acquire a three-dimensional operation during a work of a worker (2) in a work site at least as measurement information of a body motion; a determination step to determine success or failure of the work based on the evaluation reference information for evaluating the work operation based on the measurement information of the work operation; and a content creation step to create and update the training content based on the measurement information of the work operation and the determination result of the determination step, wherein in the determination step, when a predetermined body motion of the worker is detected based on the measurement information acquired in the operation measurement step, success or failure of the work is determined based on the measurement information of the work operation of a specific stage during the work of a model worker up to the body motion, and in the content creation step or the first content output step, when the determination result is determined to be the failure of the work in the determination step, the training content is updated so as to suppress a factor of the failure.

By this configuration, since the training content is updated so as to suppress the factor of failure when it is determined that the result of the determination is a failure of the work, the failure of the work such as an accident, a procedure mistake, a mistake of used tool and the like occurred in the site work (hereinafter collectively referred to as failure) can be efficiently reflected to the training content used in the training, thereby making it easy to maintain the training contents.

Effect of the Invention

According to the present invention, it is possible to provide a content presentation system capable of efficiently reflecting the failure occurred in the on-site work to the training content and easily maintaining the training content.

BRIEF DESCRIPTION OF THE DRAWINGS

FIG. 7 is a configuration diagram of a work operation information record database shown in FIG. 3.

FIG. 8 is a configuration diagram of a worker information record database shown in FIG. 3.

FIG. 9 is a configuration diagram of a work target device information record database shown in FIG. 3.

FIG. 10 is a configuration diagram of a training terminal database shown in FIG. 4.

FIG. 11 is a configuration diagram of a work analysis result database shown in FIG. 5.

FIG. 12 is a configuration diagram of a training content database shown in FIG. 6.

DETAILED DESCRIPTION OF THE INVENTION

Figure 1:
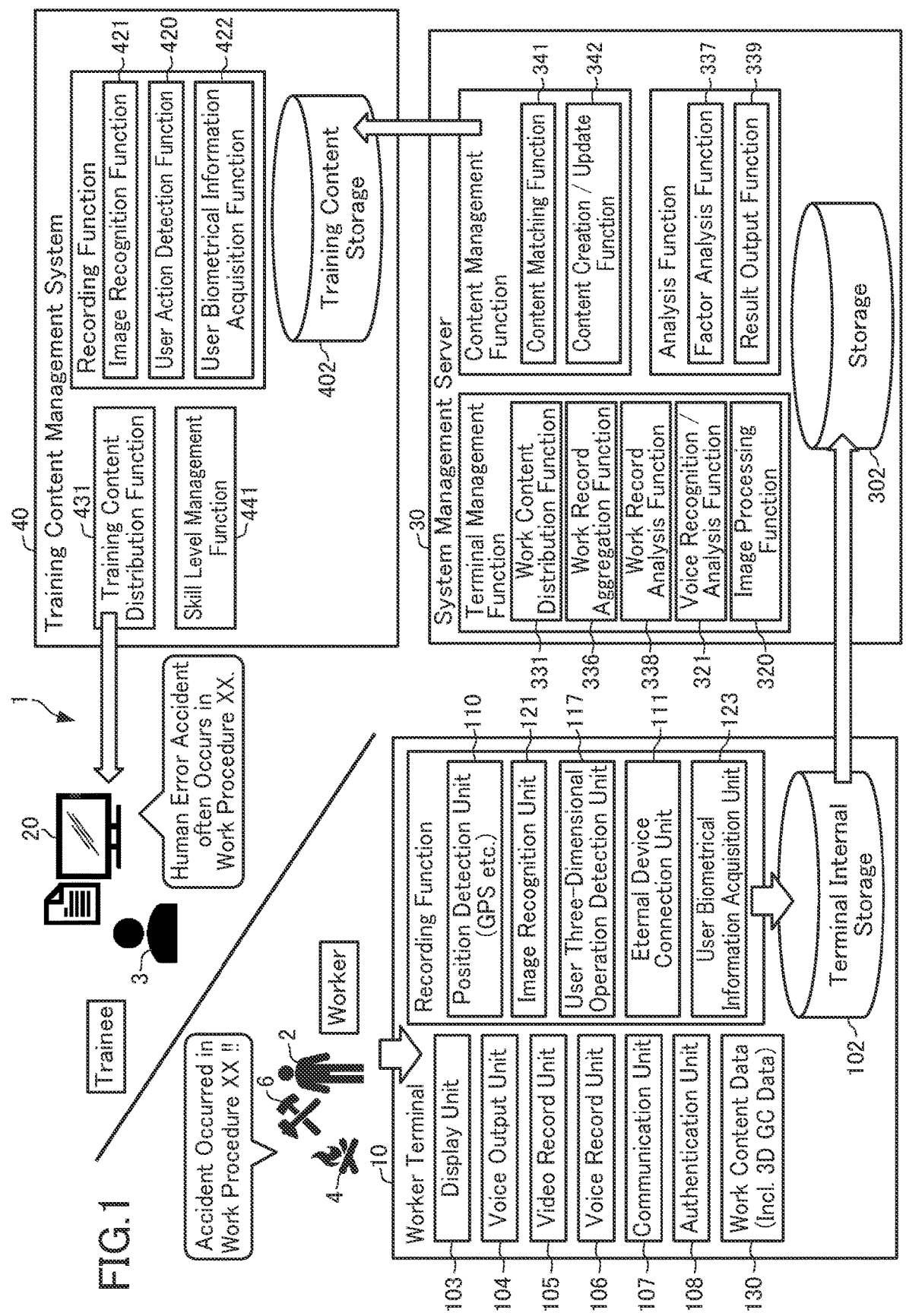
FIG. 1 is a configuration diagram of a content presentation system according to an embodiment of the present invention.

Hereinafter, a content presentation system according to an embodiment of the present invention will be described with reference to the drawings.

A content presentation system 1 according to the present embodiment is a system that presents necessary information such as work procedures to a worker 2 who executes works such as maintenance and inspection of a device in a work site and a trainee 3 in a training site, and also presents a training content to the trainee 3.

To be specific, the content presentation system 1 presents a three-dimensional shape information of the device (work target device) 4 to be worked and the training content based on the work procedure to the trainee 3. In addition, the content presentation system 1 presents the work procedure using an augmented reality based on a three-dimensional shape information of the work target device 4 and a corresponding training object device 5 to the worker 2 in the work site and the trainee 3.

Figure 2:
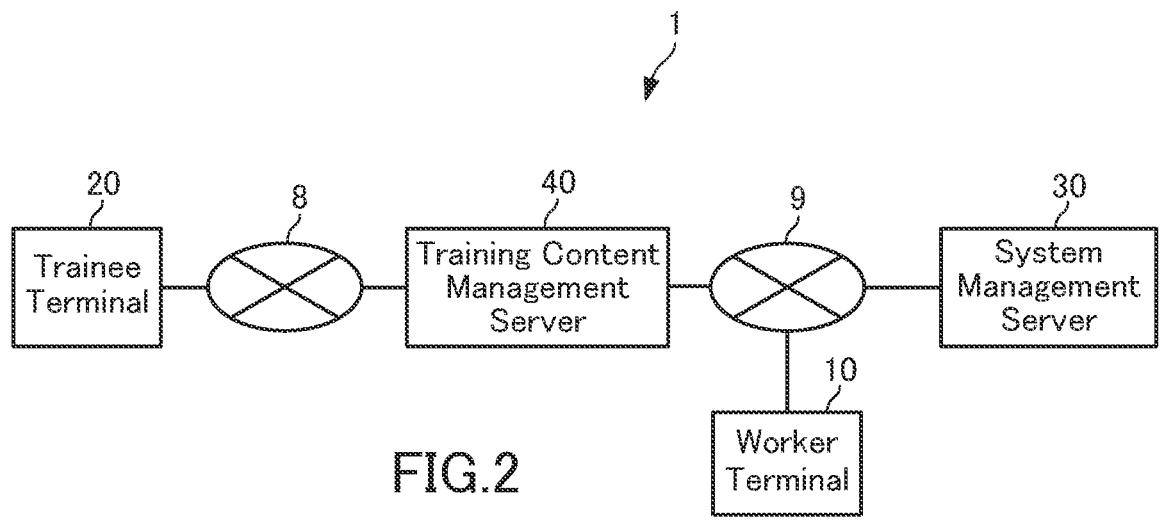
FIG. 2 is a network configuration diagram of a content presentation system according to an embodiment of the present invention.

FIG. 1 is a configuration diagram showing a configuration of the content presentation system 1 according to an embodiment of the present invention. FIG. 2 is a configuration diagram of the content presentation system 1 connected to a network. As shown in FIG. 1 and FIG. 2, the content presentation system 1 includes a worker terminal 10, a trainee terminal 20, a system management server 30, and a training content management server 40, which are respectively connected to the network 8, 9.

The content presentation system 1 according to the embodiment of the present invention may be configured not via a network and the system management server 30 and the training content management server 40 may be integrated to constitute one management server.

(Worker Terminal)

First, the worker terminal 10 will be described.

The worker terminal 10 is, for example, a head mounted display (HMD), a smartphone, a tablet terminal, or the like. In addition, the worker terminal 10 is adapted to acquire biometric information from a biometric sensor attached to the worker 2. Examples of the biometric information include heart rate, blood pressure, body temperature, amount of perspiration, and the like.

Figure 3:
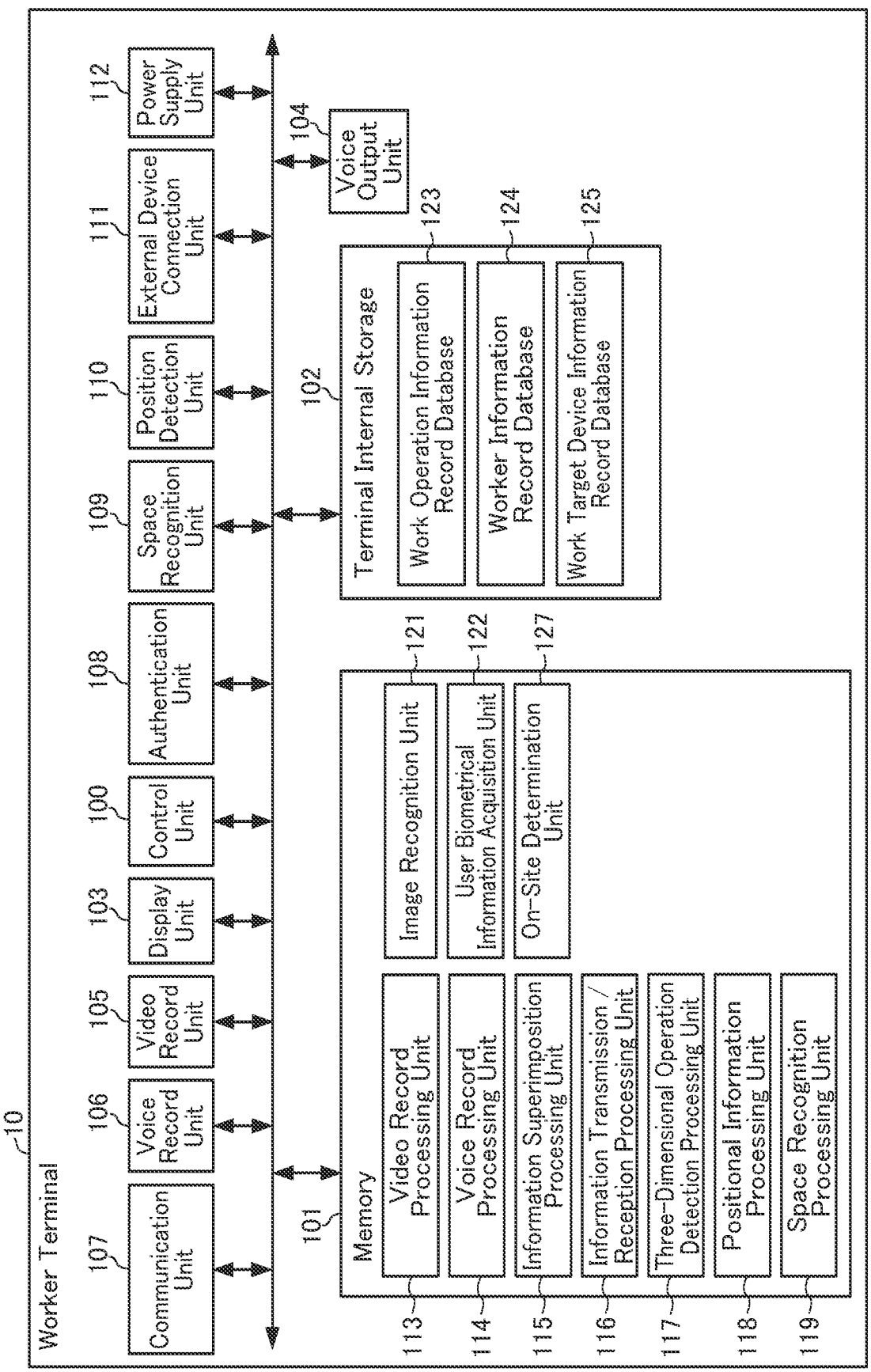
FIG. 3 is a configuration diagram of a worker terminal shown in FIG. 1.

FIG. 3 is a configuration diagram showing a configuration of the worker terminal 10.

As shown in FIG. 3, the worker terminal 10 includes a control unit 100, a memory 101 storing various processing programs, a terminal internal storage 102 storing various databases, a communication unit 107, a voice record unit 106, an image recording unit 105, a display unit 103, a voice output unit 104, an authentication unit 108, a space recognition unit 109, a position detection unit 110, an external device connection unit 111, and a power supply unit 112.

The control unit 100 may be configured to use a computer having a CPU, a ROM, a RAM, an input/output interface, an external storage device, and the like, and a part or all of the functions of the control unit are realized by executing various processing programs stored in the memory 101 by the CPU.

The communication unit 107 communicates with the system management server 30 and the training content management server 40 via a network.

The voice record unit 106 includes a microphone, and records the voice of the worker 2 during the work time, sounds emitted from the work target device 4, sounds in the vicinity, and the like.

The video record unit 105 includes a camera or a video camera, and records the work, for example, so that the work target device 4 and the arm of the worker 2 are captured.

The display unit 103 displays the work content including the work procedure according to the augmented reality technology, and is constituted, specifically, by a display unit such as a head mounted display (HMD), a smartphone, a tablet terminal, or the like.

The voice output unit 104 includes a speaker, and for example, guides the work procedure to the worker 2 by voice and calls attention by voice, together with the display of the work content including the work procedure on the display unit 103 by the augmented reality technology, or by itself alone.

The authentication unit 108 confirms the usage qualification of the worker 2 by a known authentication method, so that only the worker 2 having the usage qualification can use the worker terminal 10.

The space recognition unit 109 includes a ToF (Time Of Flight) sensor, and detects a spatial positional relationship of the worker 2 with respect to the work target device 4 by measuring the distance between the work target device 4 and the worker 2. Thus, for example, contact between the worker 2 and the work target device 4 can be detected.

The position detection unit 110 is configured to detect the position of the worker terminal 10 by GPS (Global Positioning System).

The external device connecting unit 111 is adapted to be connected to an external device such as a monitor device, a printer device, an external storage device or the like as necessary.

The power supply unit 112 supplies electric power necessary for driving the worker terminal 10.

The memory 101 stores various processing programs constituting a video recording processing unit 113, an audio recording processing unit 114, an information superposition processing unit 115, an information transmission/reception processing unit 116, a three-dimensional motion detection processing unit 117, a position information processing unit 118, a space recognition processing unit 119, an image recognition unit 121, the user biometric information acquisition unit 122, and the on-site determination unit 127. These processing programs can realize the respective processing functions by being executed by the CPU of the control unit 100, The video recording processing unit 113 drives and controls the image recording unit 105 to execute a process of recording the work video(recording), when the processing programs are executed by the CPU of the control unit 100.

The sound recording processing unit 114 drives and controls the voice record unit 106 to execute a process of recording sound during the work, when the processing programs are executed by the CPU of the control unit 100.

The information superimposition processing unit 115 executes a process of superimposing and displaying the work procedure information on an augmented reality screen, for example, when the processing programs are executed by the CPU of the control unit 100.

The information transmission/reception processing unit 116, for example, drives and controls the communication unit 107 to execute a process of transmitting/receiving information to/from the system management server 30 or the training contents management server 40, when the processing programs are executed by the CPU of the control unit 100. In the case that the biometric sensor attached to the worker 2 has a wireless communication function and is capable of transmitting biometric information, the information transmission/reception processing unit 116 may drive and control the communication unit 107 to receive the biometric information of the worker 2 which is transmitted from the biometric sensor.

The three-dimensional operation detection processing unit 117 measures and detects the three-dimensional operation during the work of the worker 2 from the work video, the image recognition result, the space recognition result, the three-dimensional shape information of the work target device 4 and the like, when the processing programs are executed by the CPU of the control unit 100. The three-dimensional operation can be detected as information on the transition of a position in the three-dimensional space with respect to a feature point (a joint, a fingertip, and the like) of a specific part (arm, wrist, and the like) of the body of the worker 2. The three-dimensional operation detection processing unit 117 corresponds to the operation measurement device of the present invention.

The position information processing unit 118 drives and controls the position detection unit 110 to execute processing for detecting the position of the worker terminal 10, when the processing programs are executed by the CPU of the control unit 100.

The space recognition processing unit 119 drives and controls the space recognition unit 109 to execute a process of measuring the distance between the work target device 4 and the worker 2, when the processing programs are executed by the CPU of the control unit 100.

The image recognition unit 121 executes the image recognition processing on the image recorded by the image recording unit 105, when the processing programs are executed by the CPU of the control unit 100, so that the work target device 4, the worker 2 (arm, wrist and the like) and a work tool 6 can be recognized.

The user biometric information acquisition unit 122 is configured to acquire the biometric information of the worker 2 from the biometric sensor attached to the worker 2, when the processing programs are executed by the CPU of the control unit 100.

The on-site determination unit 127 determines whether or not the three-dimensional movement of the work of the worker 2 at the site deviates from the reference three-dimensional operation in the corresponding procedure, when the processing programs are executed by the CPU of the control unit 100. The reference three-dimensional operation is a three-dimensional operation when the model worker performs work, and is measured and stored in advance. Further, when the on-site determination unit 127 determines that the deviation of the three-dimensional operation of the worker 2 in the on-site work compared to the reference three-dimensional operation is large, the on-site determination unit 127 may make an attention call display on the display unit 103 of the worker terminal 10.

In the terminal internal storage 102, a work operation information record database 123, an operator information record database 124, and a work target device information record database 125 are stored.

FIG. 7 is a configuration diagram showing a configuration of the work operation information record database 123. As shown in FIG. 7, items recorded in each record (row) of the work operation information record database 123 includes a worker No., an observation part (specific part), a work No., a procedure No., a normal operation No., video record, voice record, operation conformity level, work position transition, and work time.

The worker No. is an identification number uniquely assigned to each worker. The observation part is, for example, an arm, a wrist, a leg and the like of the worker 2, and the part to be observed is determined according to the work content. The work number is a number uniquely assigned to identify the work. Procedure No. is a number for specifying which procedure among the work procedures for the work identified by the work No. Normal operation No. is a number uniquely assigned to specify normal operation (reference operation).

In the video record, the name of the video file in which the work is recorded is described, so that it is possible to access the video record separately stored in the storage 302 and the like of the system management server 30. In the voice record, the name of the voice file in which the voice in the time of the work is recorded is described, so that it is possible to access the voice record separately stored in the storage 302 and the like of the system management server 30.

The operation conformity level is an index showing how the three-dimensional operation of the worker is matched to the three-dimensional reference operation (normal operation), which is the three-dimensional operation of the model worker. The work position transition is a record of the positional transition of the feature points of the observation part with respect to the motion of an object with a low operation conformity level. For example, in FIG. 7, it can be understood that the third record (row) from the top and the seventh record (row) from the top have the operation conformity level of 20% and 60%, respectively, which are lower than others. In such a case, the positional transition of the feature points of the arm of the worker 2 which is the observation part is recorded. Work time is the time required for the work.

A record (row) data is added to the work action information record database 123 every time the worker 2 executes the work specified by the work No. and the procedure number.

FIG. 8 is a configuration diagram showing a configuration of the worker information record database 124. As shown in FIG. 8, the items recorded in each record (row) of the worker information record database 124 are the worker No, the work No, the procedure No., the heart rate, the blood pressure, the body temperature, the perspiration and the work time.

The worker No., the work No., the procedure No., the work time are the same as those of the work action information record database 123. The heart rate, the blood pressure, the body temperature, and the perspiration are information acquired from a biometric sensor attached to the worker 2.

By finding items that are largely deviating from the average value of the whole work, it is possible to extract the work where an accident or failure occurred. For example, it is understood that the third record (row) from the top in FIG. 8 has larger values of the heart rate, the blood pressure, and the perspiration than others. Also, the seventh record (row) from the top shows that body temperature is lower than others. From these kinds of information, it is possible to estimate the work where the accident or failure occurred and the cause (such as whether or not it is due to a human error) thereof.

In the worker information record database 124, a record (row) data is added each time the worker 2 executes the work specified by the work No. and the procedure No.

FIG. 9 is a configuration diagram showing the configuration of the work target device information record database 125. As shown in FIG. 9, the items to be recorded in each record (row) of the work target device information record database 125 are the worker No., the observation device, the work No, the procedure No., the normal operation No, the video record, the voice record, the operation conformity level and the model.

The worker No., the work No, the procedure No., the normal operation No, the video record, the voice record and the operation conformity level are the same with those of the work action information record database 123.

The observation device indicates a device to be worked on or an object to be observed (for example, a screw, a wire, a cover, a handle, a keyboard, etc.) specified by the procedure No. of the work No. In the model, the name of the 3D model file including the three-dimensional shape information of the work target device 4 is described, so that it is possible to access the 3D model separately stored in the terminal internal storage 102 or the like. The 3D model file may be stored in the storage 302 of the system management server 30 or in the training contents storage 402 of the training content management server 40, or stored in either one of the storages, and transferred when to be used elsewhere.

The information acquired by the worker terminal 10 is stored in each record (row) of the work target device information record database 125. The information to be distributed to the display unit 103 of the worker terminal 10 and the like is also stored in each record (row) of the work target device information record database 125.

A record (row) data is added to the work target device information record database 125 every time the worker 2 executes the work specified by the work No. and the procedure number.

(Trainee Terminal)

Next, the trainee terminal 20 will be described.

The trainee terminal 20 is, for example, a head mounted display (HMD), a smartphone, a tablet terminal, or the like. In addition, the trainee terminal 20 is adapted to acquire biometric information of the trainee 3 from the biometric sensor attached to the trainee 3. Examples of the biometric information include heart rate, blood pressure, body temperature, amount of perspiration, and the like.

Figure 4:
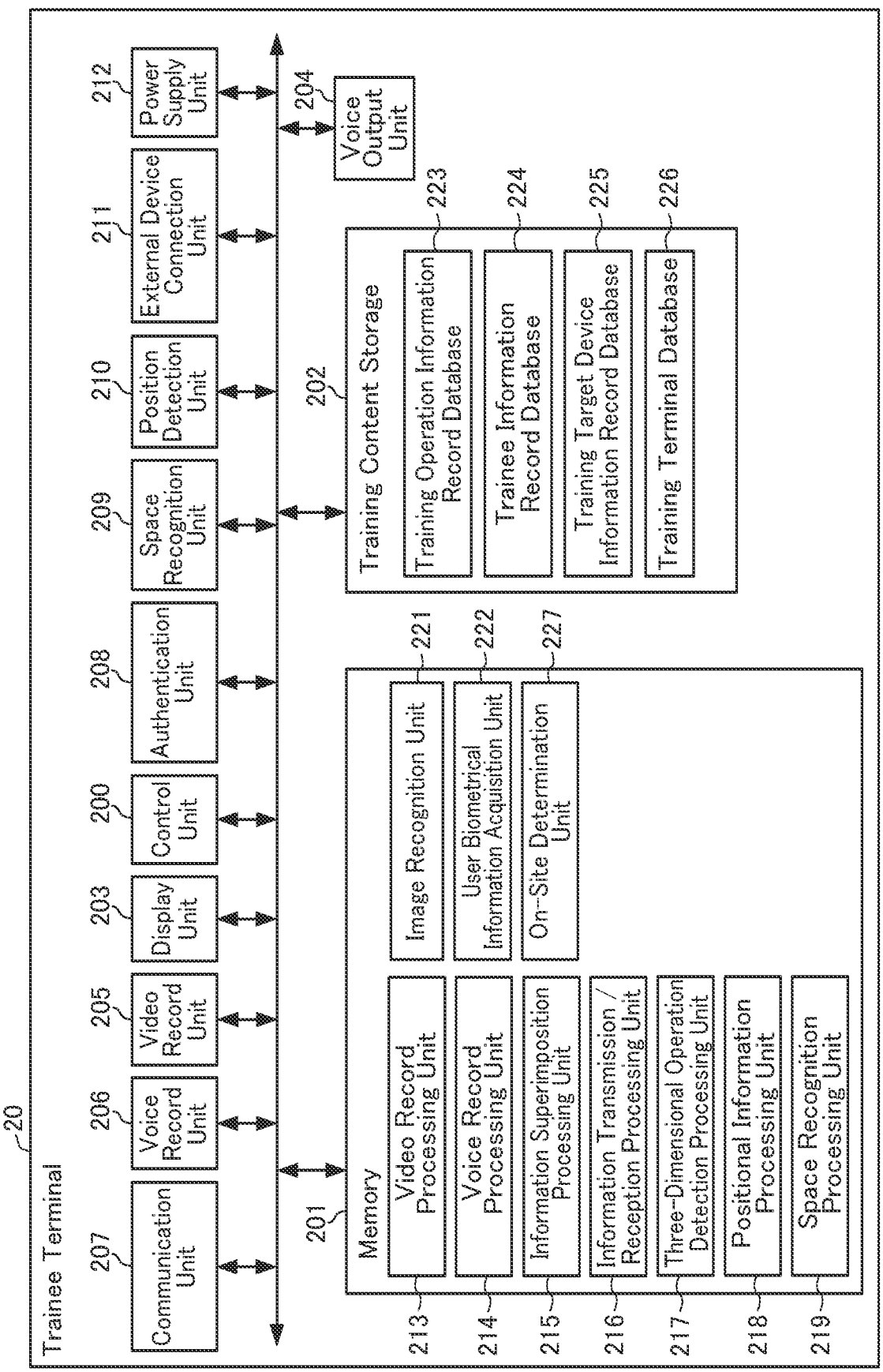
FIG. 4 is a configuration diagram of a trainee terminal shown in FIG. 1.

FIG. 4 is a configuration diagram showing a configuration of the trainee terminal 20.

As shown in FIG. 4, the trainee terminal 20 includes a control unit 200, a memory 201 storing various processing programs, a training content storage 202 storing various databases, a communication unit 207, a voice record unit 206, a video record unit 205, a display unit 203, a voice output unit 204, an authentication unit 208, a space recognition unit 209, a position detection unit 210, an external device connection unit 211, and a power supply unit 212.

The control unit 200, the memory 201 storing various processing programs, the communication unit 207, the voice record unit 206, the video record unit 205, the display unit 203, the voice output unit 204, the authentication unit 208, the space recognition unit 209, the position detection unit 210, the external device connecting unit 211, and the power supply unit 212 have the same functions as the corresponding components of the worker terminal 10, so a detailed description thereof will be omitted.

The memory 201 stores various processing programs constituting a video record processing unit 213, an audio record processing unit 214, an information superposition processing unit 215, an information transmission/reception processing unit 216, a three-dimensional operation detection processing unit 217, a position information processing unit 218, a space recognition processing unit 219, an image recognition unit 221, a user biometrics information acquisition unit 222, and an on-site determination unit 227 of the trainee terminal 20. These processing programs are executed by the CPU of the control unit 200 so that respective processing functions can be realized. Since the above processing programs implement the same function as the corresponding processing program of the worker terminal 10, the detailed explanation will be omitted.

The training content storage 202 is provided with a training operation information record database 223, a trainee information record database 224, a training target device information record database 225, and a training terminal database 226.

Since the training operation information record database 223, the trainee information record database 224, and the training target device information record database 225 are the same as the corresponding database structure of the worker terminal 10, except that the worker has replaced the trainee, detailed description will be omitted.

FIG. 10 is a configuration diagram showing the configuration of the training terminal database 226. As shown in FIG. 10, the items recorded in each record (row) of the training terminal database 226 are the worker No., a target device, a target part, the procedure No., a display specification definition No., the display content, a work video, and a work voice.

The work No. is a number uniquely assigned to identify the work. The target device indicates a device (For example, screw, wire, cover, keyboard, and the like) used in the training. The target part is, for example, an arm, a wrist or the like of the worker 2, and is determined according to the work content. The procedure No. is a number for specifying which procedure among the work procedures for the work identified by the work No.

The display specification definition number is a number uniquely assigned for specifying the display specification definition defining the display specification of the screen. The display contents indicate display contents such as whether to issue a warning or a description of a procedure.

In the work video, a file name of the work video to be presented to the trainee at the time of training is described, so that it is possible to access the work video separately stored in the storage 402 etc. of the training content management server 40. In the work voice, a name of the sound file in which the work voice to be presented to the trainee at the training time is recorded is described, so that it is possible to access the work sound separately stored in the storage 402 or the like of the training content management server 40.

Only data necessary for training is distributed from the training content management server 40 and stored in the training terminal database 226.

(System Management Server)

Next, the system management server 30 will be described.

Figure 5:
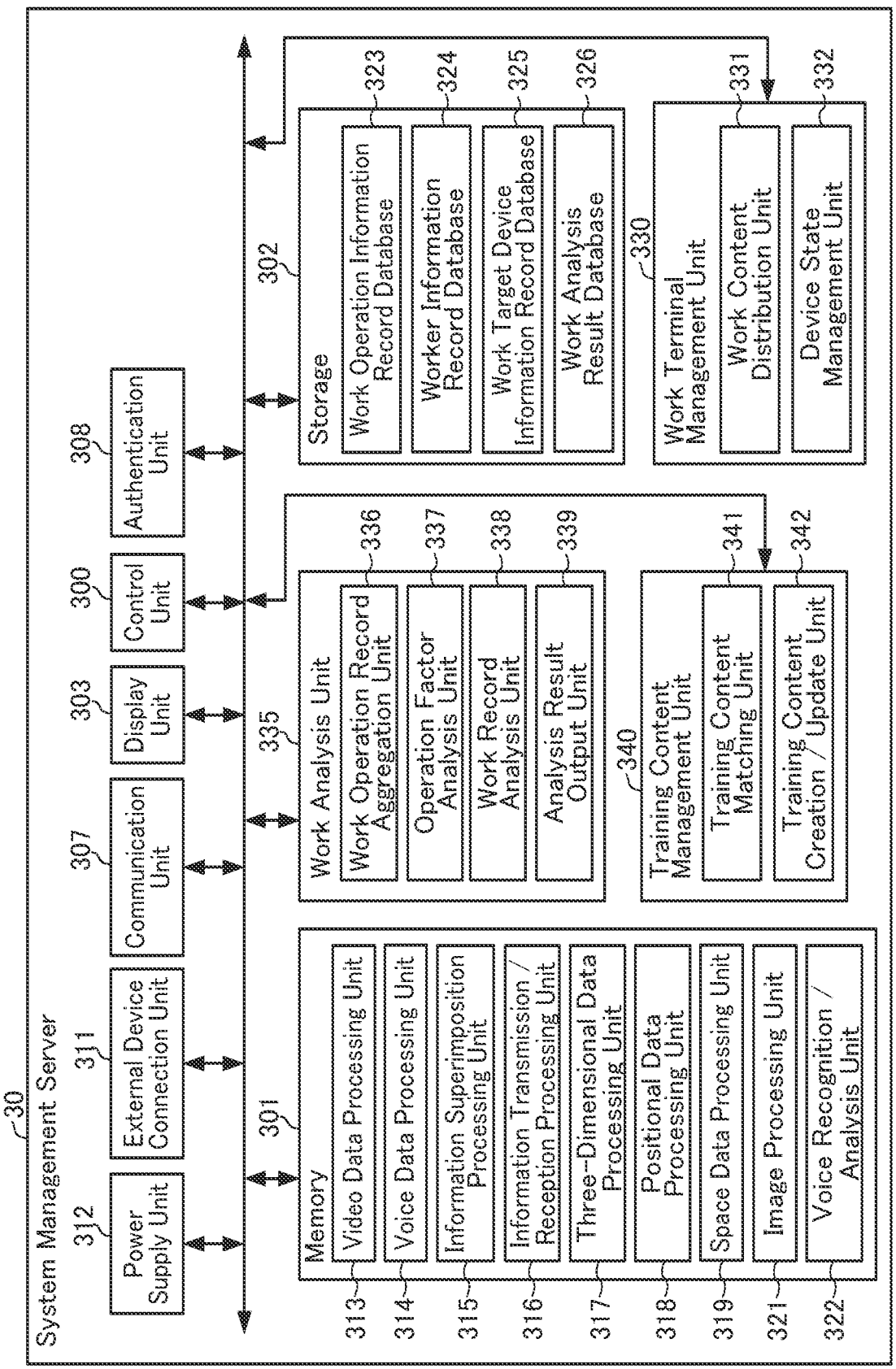
FIG. 5 is a configuration diagram of a system management server shown in FIG. 1.

FIG. 5 is a configuration diagram of the system management server 30.

As shown in FIG. 5, the system management server 30 includes a control unit 300, a memory 301 storing various processing programs, a storage 302 storing various databases, a communication unit 307, a display unit 303, an authentication unit 308, an external device connection unit 311, a power supply unit 312, a work terminal management unit 330, a work analysis unit 335, and a training content management unit 340.

The work terminal management unit 330 corresponds to a second content output device of the present invention, the work analysis unit 335 corresponds to a determination device of the present invention, and the training content management unit 340 corresponds to a content creation device of the present invention.

The control unit 300 may be configured to use a computer having a CPU, a ROM, a RAM, an input/output interface, an external storage device, and the like, and part or all of the functions of the system management server 30 can be realized by executing various processing programs stored in the memory 301 by the CPU.

The communication unit 307 communicates with the worker terminal 10 and the training content management server 40 via a network.

The display unit 303 is includes a liquid crystal display or the like, and is capable of displaying the work video of the worker 2, the management status of the system, and the like.

The authentication unit 308 confirms the usage qualification of the user by a known authentication method, so that only the user qualified for use can use the system management server 30.

The external device connection unit 311 can be connected to an external device such as a monitor device, a printer device, an external storage device or the like as necessary.

The power supply unit 312 supplies electric power necessary for driving the system management server 30.

<Memory>

The memory 301 stores various kinds of processing programs constituting a video data processing unit 313, a voice data processing unit 314, an information superimposition processing unit 315, an information transmission/reception processing unit 316, a three-dimensional data processing unit 317, a position data processing unit 318, a space data processing unit 319, an image processing unit 321, and the voice recognition/analysis unit 322. These respective functions be realized by executing various processing programs by the CPU of the control unit 300.

The video data processing unit 313 performs various data processing on the work video data transmitted from the worker terminal 10 by executing the processing program by the CPU of the control unit 300.

The voice data processing unit 314 performs various data processing on the work sound data transmitted from the worker terminal 10 by executing the processing program by the CPU of the control unit 300.

When the processing program is executed by the CPU of the control unit 300, the information superimposition processing unit 315 executes a process of superimposing and displaying the work procedure information on an augmented reality screen, for example.

When the processing program is executed by the CPU of the control unit 300, the information transmission/reception processing unit 316 drives and controls the communication unit 307 to execute a process of transmitting/receiving information to/from the worker terminal 10 or the training content management server 40.

When the processing program is executed by the CPU of the control unit 300, the three-dimensional data processing unit 317 executes the various data processing with respect to the three-dimensional data, with the three-dimensional shape information of the work target device 4 taken into consideration, in creating and updating the training content and analysis of the work record. For example, the three-dimensional data processing unit 317 executes the data processing for recognizing the three-dimensional operation of the worker 2.

When the processing program is executed by the CPU of the control unit 300, the position data processing unit 318 executes various data processing on the position data transmitted from the worker terminal 10.

When the processing program is executed by the CPU of the control unit 300, the space data processing unit 319 executes various data processing on the space (distance) data transmitted from the worker terminal 10.

When the processing program is executed by the CPU of the control unit 300, the image processing unit 321 executes data processing such as image recognition. By the image recognition, for example, it is possible to recognize the work target device 4, the arm and hand of the worker 2, a work tool 6, and the like.

When the processing program is executed by the CPU of the control unit 300, the voice recognition/analysis unit 322 executes data processing such as voice recognition on the voice data transmitted from the worker terminal 10. By the voice recognition, for example, it is possible to recognize the voice of the worker 2, the sound emitted by the work target device 4, and the like.

<Work Terminal Management Unit>

The work terminal management unit 330 includes a work content distribution unit 331 and a device state management unit 332. The work terminal management unit 330 corresponds to a second content output device of the present invention.

The work content delivery section 331 distributes the work content to the worker terminal 10. In other words, the work content delivery unit 331 presents the work procedure to the worker 2 in the site by the augmented reality, based on the three-dimensional shape information of the work target device 4. The work content includes a video displayed on the display unit 103 of the worker terminal 10, superimposing the augmented reality on the actual image of the work site, and a voice outputted from the sound output unit 104. The work content may be constituted by video only or voice only.

To be specific, the work content includes, for example, an explanation display of a work procedure, an indication for calling attention, a display of environment information and status information on the display unit 103 of the worker terminal 10. The explanation of the work procedure may include, for example, a display "Procedure 3: Fix the wire with screw.". The environmental information may include, for example, the temperature and humidity of the work environment. The status information may include the procedure conformity level, the progress of the work, the elapsed time, the physical condition of the worker and the like.

For example, the indication for calling attention is "Incorrect Procedure !!" and the like. For example, when the on-site determination unit 127 determines that the deviation of the three-dimensional operation of the worker 2 in the on-site work from the reference three-dimensional operation is large, the above-mentioned indication for calling attention may be displayed on the display unit 103.

The device state management unit 332 stores and manages the specifications of the devices related to the work including the operation target device 4, the state thereof, and the information on the environment of the work site.

<Work Analysis Unit>

The work analysis unit 335 includes a work operation record aggregation unit 336, an operation factor analyzing unit 337, a work record analyzing unit 338, and an analysis result output unit 339. The work analysis unit 335 corresponds to a determination device of the present invention.

The work operation record aggregation unit 336 acquires and aggregates records of work operation by the worker 2. The information on the work operation of the worker 2 is stored in the work operation information record database 323 stored in the storage 302.

The operation factor analysis unit 337 analyzes factors of work operation, for example, the factor of the work failure. It is necessary to analyze from various viewpoints such as whether the factor of the failure of the work is due to the physical condition of the worker, if there is no problem in the physical condition, whether it is due to carelessness, communication mistake, or a problem in work procedure or manual. The factor of the failure of the work may be analyzed and inputted by the worker 2 or his or her supervisor.

The work record analysis unit 338 analyzes the work record (work operation information, worker information, work target device information, and the like) from the view point of the operation conformity level, suitability of the used tool, the work time, presence or absence of contact with the work target device, the biometric information, and the like, thereby to determine success or failure of the work.

For example, a measured information of the work of the worker 2 from the three-dimensional operation detection processing unit 117 of the worker's terminal 10 is compared with the measured information of the work by the model worker, thereby to calculate a conformity level of the both work operations.

The conformity level may, for example, be obtained by calculating a deviation from the reference of the three-dimensional positional transition of the corresponding feature point of the specific part of the worker 2 with reference to the three-dimensional positional transition of feature points (for example, joint parts) of specific parts (arm, wrist, feet, etc.) of a model worker. The conformity level may be calculated at a start or end of the operation, or may be calculated a plurality of points in time at a predetermined interval between the start and the end of the work, or the average thereof may be calculated. The work may be determined to have failed in the case that the deviation is in excess of a predetermined criterion value.

Further, the tool 6 used by the worker 2 may be identified by image recognition of the work video, and it may be determined whether or not the tool suitable for the work is being used. In the case where an improper tool is used, it may be determined that the operation has failed.

In addition, it may be determined whether or not the work according to the work procedure is being executed by image recognition of the work video of the worker 2. It may be determined that the work failed if it is determined that the designated work procedure is not followed, such as a mistake in procedure (error in sequence), procedure omission and the like.

In addition, if the time taken by the worker 2 exceeds a reference time, it may be determined that the work has failed. The reference time can be appropriately set to, for example, twice the average operation time or the like, based on the work time of the model worker and the work time of other workers.

Further, it may be determined whether or not the worker 2 or the tool 6 used by the worker 2 has come into contact with the work target device 4 by the image recognition of the work video of the worker 2, in the case that part or all of the work target device cannot be contacted due to a high temperature. In this determination, the contact may be determined by using the space data (information on the distance from the worker 2 to the work target device 4) acquired by the space recognition unit 109 of the worker terminal 10 in addition to the information of the image recognition, or by the information of the image recognition alone. It may be determined that the operation has failed if determined to be in contact.

The analysis result output unit 339 outputs the analysis result of the work record to the work analysis result database 326 and the like.

Further, the work analysis unit 335 as a determination device has a storage unit and stores evaluation reference information for evaluating the work operation based on the measurement information of the work operation in the site. The evaluation reference information may be prepared by acquiring the work operation of the model worker in advance as measurement information and preparing the evaluation reference information with respect to the specific stage of the work, based on the measurement information.

To be specific, for example, when the on-site determination unit 127 of the worker terminal 10 determines that the three-dimensional operation of the body of the worker 2 in the on-site work deviates from the reference three-dimensional operation, the work record analysis unit 338 may determine whether or not the operation is unsuccessful based on the measurement information (that is, the evaluation reference information) of the model worker during the work in the specific stage up to the point of the aforementioned body operation. Failure can be effectively determined by selecting the work having a high possibility of failure in the worker terminal 10 and precisely determining whether or not the selected work has failed in the work analysis unit 335 of the system management server 30.

<Training Content Management Unit>

The training content management unit 340 includes a training content matching unit 341 and a training content creation/update unit 342. The training content management unit 340 constitutes a content creating device of the present invention.

The training content matching unit 341 matches the on-site work on which the work analysis has been performed with the corresponding training content stored in the training content management server 40.

When, as a result of the matching by the training content matching unit 341, there is no training content corresponding to the site work to which the work analysis has been performed, the training content creating/updating unit 342 newly creates the training content. On the other hand, when there already exists a training content corresponding to the site work to which the task analysis has been performed, the training content creating/updating unit 342 changes the training content so as to reflect the correction content based on the analysis/determination result.

To be specific, when it is determined that the result of the determination by the work analysis unit 335 is a failure of the work, the training content creation/update unit 342 updates the training content so as to suppress the factor of failure. The training content may be updated by, for example, the training content management unit 440 or the training terminal management unit 430 on the side of the training content management server 40.

In addition, the training content creating/updating unit 342 may update the training content so as to increase the matching degree according to the determination result of the matching degree by the work analysis unit 335. The updating of the training content may be performed by, for example, the training content management unit 440 or the training terminal management unit 430 on the side of the training content management server 40.

The training content creation/updating unit 342 also updates the specifications of the devices involved in the work, including the work target device 4, when the specifications of the devices involved in the work are changed or when the environment of the work site is changed, so that the change information is reflected to the training content. The information on the specifications of the device and the environment of the work site is stored in the device state management unit 332 of the work terminal management unit 330. When the device specification or the like is changed under the control of the control unit 300, the training content creation/updating unit 342 may change the training content with reference to the device state management unit 332.

<Storage>

A work operation information record database 323, an operator information record database 324, a work target device information record database 325, and a work analysis result database 326 are stored in the storage 302.

Since the work operation information record database 323, the worker information record database 324, and the work target device information record database 325 are respectively the same as the corresponding database structure of the worker terminal 10, a detailed description thereof will be omitted.

FIG. 11 is a configuration diagram showing the configuration of the work analysis result database 326. As shown in FIG. 11, the items recorded in each record (row) of the operation analysis result database 326 are the work No., the target device, the target part, the correction procedure No., the correction target, the correction category, the correction content, the video record, the voice record, the work position transition, and the model.

The work No. is a number uniquely assigned to identify the work. The target device is a device to be worked on, for example, a wire, a keyboard, or the like. The target site is a target site for performing a work analysis, for example, a wrist, an arm, or the like of the worker.

The correction procedure No. shows the procedure No. of the procedure corrected as a result of the work analysis. The correction target indicates the target that has been corrected as a result of the correction analysis. The correction category is obtained by categorizing corrections, and includes, for example, "insert before", "change", and the like. The correction content indicates the specific content of the correction, for example, attention calling or specification change.

In the video record, the name of the video file in which the operation is recorded is described, so that it is possible to access the video record separately stored in the storage 302 or the like of the system management server 30. In the voice record, the name of the voice file that the voice at the work time is recorded is described, so that it is possible to access the recorded voice separately stored in the storage 302 or the like.

The work position transition indicates the positional transition of the feature point of the target part. In the model, the name of the 3D model file including the three-dimensional shape information of the work target device 4 is described, so that it is possible to access the 3D model file separately stored in the storage 302 or the like.

Based on the result of the work analysis, the system management server 30 determines the work procedure to be corrected and the content to be corrected and stores the corrected content in the work analysis result database 326. Contents to be corrected may include an addition of a dangerous indication, an addition of an indication of attention, a change of specification information of the device, a change of information of the on-site environment, and the like.

(Training Content Management Server)

Next, the training content management server 40 will be described.

Figure 6:
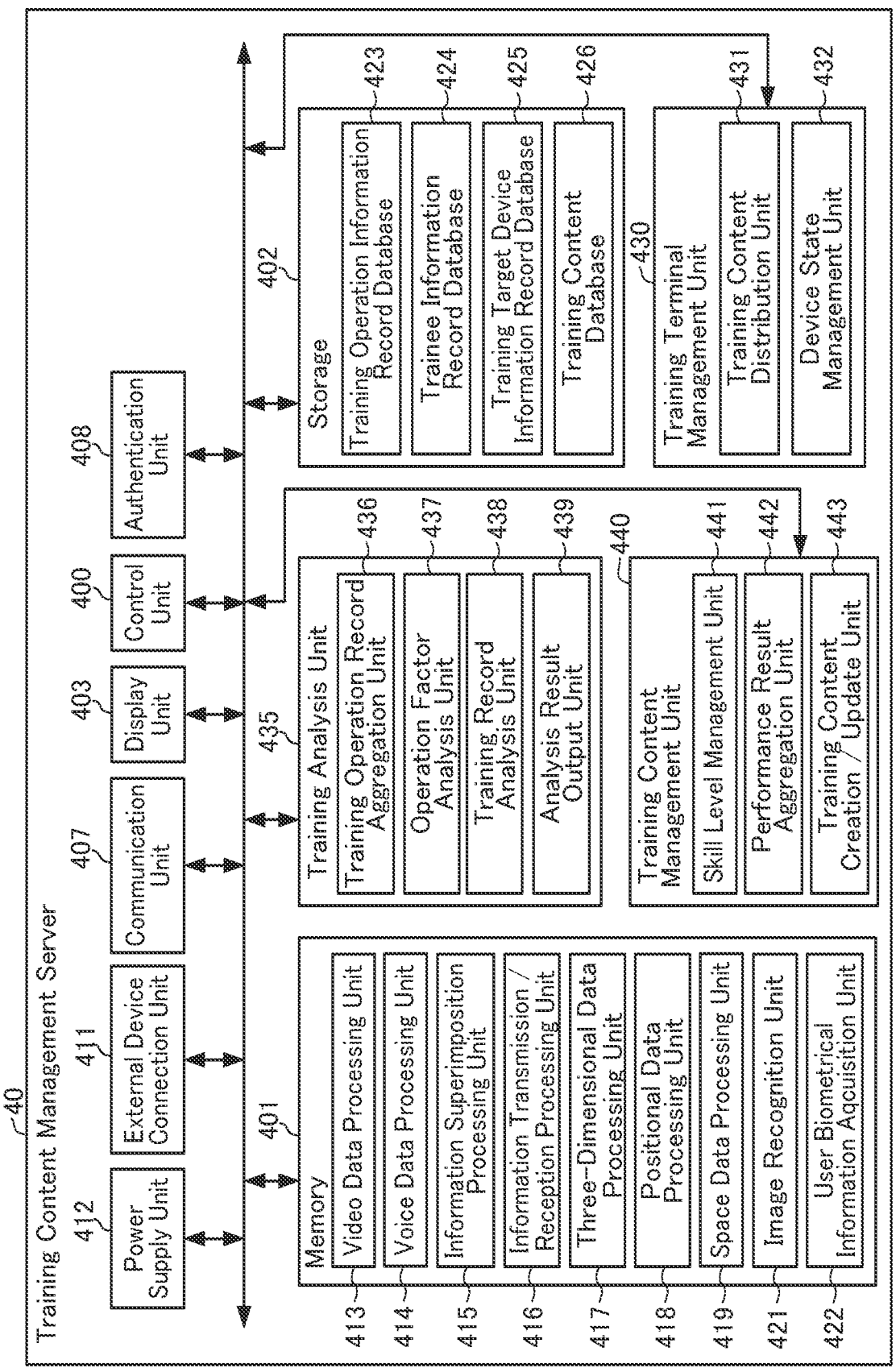
FIG. 6 is a configuration diagram of a training content management server shown in FIG. 1.

FIG. 6 is a configuration diagram of the training content management server 40.

As shown in FIG. 6, the training content management server 40 includes a control unit 400, a memory 401 storing various processing programs, a storage 402 storing various databases, a communication unit 407, a display unit 403, an authentication unit 408, an external device connection unit 411, a power supply unit 412, a training terminal management unit 430, a training analysis/analysis unit 435, and a training content management unit 440.

The training terminal management unit 430 corresponds to a first content output device of the present invention.

The control unit 400 may be configured to use a computer having a CPU, a ROM, a RAM, an input/output interface, an external storage device and the like, and part or all of the functions of the training content management server 40 can be realized by executing various processing programs stored in the memory 401 by the CPU.

The communication unit 407 communicates with the trainee terminal 20, the worker terminal 10, and the system management server 30 via the networks 8 and 9.

The display unit 403 is constituted by a liquid crystal display or the like, and is capable of displaying information necessary for content management, such as management status of training contents, in addition to training images.

The authentication unit 408 confirms the usage qualification of the user by a known authentication method, so that only the user having the usage qualification can use the training content management server 40.

The external device connecting unit 411 can be connected to an external device such as a monitor device, a printer device, an external storage device or the like as necessary.

The power supply unit 412 supplies electric power necessary for driving the training content management server 40.

The memory 401 stores various processing program that constitute a video data processing unit 413, a voice data processing unit 414, an information superposition processing unit 415, an information transmission/reception processing unit 416, a three-dimensional data processing unit 417, a position data processing unit 418, a space data processing unit 419, image recognition unit 421, and user biometric information acquisition unit 422. By executing these processing programs by the CPU of the control unit 400, respective processing functions can be realized.

The image data processing unit 413 executes various data processing on the training image data transmitted from the trainee terminal 20 by executing the processing program by the CPU of the control unit 400.

The voice data processing unit 414 executes a processing program by the CPU of the control unit 400, so as to execute data processing such as voice recognition on the training voice data transmitted from the trainee terminal 20. By the voice recognition, for example, it is possible to recognize the voice of the trainee 3, the sound emitted by the training target device, and the like.

By executing the processing program by the CPU of the control unit 400, the information superimposition processing unit 415 executes a process of superimposing and displaying work procedure information on the screen of virtual reality or augmented reality.

When the processing program is executed by the CPU of the control unit 400, the information transmission/reception processing unit 416 drives and controls the communication unit 407 to transmit/receive information to/from the trainee terminal 20, the worker terminal 10 or the system management server 30.

By executing the processing program by the CPU of the control unit 400, the three-dimensional data processing unit 417 executes various data processing on the three-dimensional data using the three-dimensional shape information on the training target device in the creation and update of the training content, and analysis of the training record, and the like. For example, data processing for recognizing the three-dimensional operation of the trainee 3 may be executed.

The position data processing unit 418 executes various data processing on the position data transmitted from the trainee terminal 20 by executing the processing program by the CPU of the control unit 400.

The space data processing unit 419 is adapted to execute various data processing on the space (distance) data transmitted from the trainee terminal 20 by executing the processing program by the CPU of the control unit 400.

The image recognition unit 421 executes data processing such as image recognition by executing a processing program by the CPU of the control unit 400. By the image recognition, for example, it is possible to recognize the training target device 5, the arm or hand of the trainee 3, the work tool 6, and the like.

The user biometric information acquiring unit 422 can acquire biometric information of the trainee 3 from the biometric sensor attached to the trainee 3 by executing the processing program by the CPU of the control unit 400.

<Training Terminal Management Unit>

The training terminal management unit 430 includes a training content distribution unit 431 and a device state management unit 432. The training terminal management unit 430 corresponds to a first content output device of the present invention.

The training content distribution unit 431 includes an output unit, and is configured to distribute the training content to the trainee terminal 20 so as to be able to present the training content to the trainee 3. The training content includes a video superimposed and displayed on the actual image of the training site using augmented reality and a voice output from the voice output unit 204 on the display unit 203 of the trainee terminal 20. Alternatively, the training content may include a video displayed on the display unit 203 of the trainee terminal 20 using virtual reality and a voice output from the voice output unit 204. The training content may include only video or only voice.

To be specific, the training content includes, for example, an explanation display of a work procedure, a display of attention calling, a display of environmental information and status information on the display unit 203 of the trainee terminal 20. The explanation of the work procedure includes, for example, an indication "Procedure 3: Fix the wire by screw" can be mentioned. The environmental information includes, for example, temperature and humidity in the work site. The status information includes the procedure conformity level, the progress of the work, the elapsed time, the physical condition of the trainee, and the like.

In addition, the training content distribution unit 431 includes a storage unit, and is configured to store training content including three-dimensional shape information of the work target device 4 and evaluation reference information on work operations of the work procedure. The training content distribution unit 431 corresponds to an output unit and a storage unit of a first content output device of the present invention.

The device state management unit 432 is configured to store and manage specifications and states of the device related to training including a training target device 5 and information on the training environment.

<Training Analysis Unit>

The training analysis unit 435 includes a training operation record aggregation unit 436, an operation factor analysis unit 437, a training record analysis unit 438, and an analysis result output unit 439.

The training operation record totaling unit 436 is adapted to acquire and aggregate the records of the training operation by a trainee 3.

The operation factor analysis unit 437 is adapted to analyze the factor of the training operation, for example, the factor of the failure in the training work. The factor of the failure of the training work may be analyzed and inputted by the trainee or its supervisor.

The training record analysis unit 438 analyzes the training record (training operation information, trainer information, training target device information, and the like) from the view point of the operation conformity level, suitability of the used tool, work time, presence or absence of contact with the training target device and the biometric information, and the like, thereby to determine the success or failure of the training. This determination method is the same as the determination method of the success or failure of work by the work record analysis unit 338.

The analysis result output unit 439 appropriately outputs the analysis result of the training record to the training content management unit 440 and the display unit 203 of the trainee terminal 20 which will be described later.

<Training Content Management Unit>

The training content management unit 440 includes a skill level management unit 441, a performance result aggregation unit 442, and a training content creation/update unit 443.

The skill level management unit 441 manages the skill level of the trainee 3 with respect to a specific work. To be specific, the work No. and the identification number of the trainee 3 and the skill level of the trainee 3 are stored in association with each other and managed.

The performance result aggregation unit 442 collects the performance result of the training of the trainee 3 based on the analysis result of the training record sent from the analysis result output unit 439 and the like.

The training content creation/update unit 443 has the same configuration as the training content creation/update unit 342 of the system management server 30, except that the worker is replaced by the trainee, so the detailed description thereof will be omitted.

<Storage>

In the storage 402, a training operation information record database 423, a trainee information record database 424, a training target device information record database 425, and a training content database 426 are stored.

The training operation information record database 423, the trainee information record database 424, and the training target device information record database 425 are the same as the corresponding database configuration of the worker terminal 10, except that the worker is replaced by the trainee, so the detailed description thereof will be omitted.

FIG. 12 is a configuration diagram showing the configuration of the training content database 426. As shown in FIG. 12, the items recorded in each record (row) of the training content database 426 are the work No., the target device, the target part, the procedure No., the display specification definition No., the display content, the correction content, the work voice, the position transition, and the model.

The work No. is a number uniquely assigned to identify the work. The target device is a target device of the training including, for example, a screw, a wire, a cover, a keyboard, or the like. The target part is a target part for the training analysis including, for example, a worker's wrist, an arm, or the like. The procedure No. is a number for specifying a work procedure among the work procedures for the work identified by the work No.

The display specification definition No. is a number uniquely assigned for specifying the display specification definition defining the display specification of the screen. The display content indicates, for example, display content such as whether to issue a warning or a description of a procedure. The content of correction indicates the specific content of correction including, for example, attention calling or specification change.

The work video includes the video file name of the work video presented to the trainee at the training time, by which the work video separately stored in the storage 402 or the like can be accessed. The work voice includes the voice file name of the work voice presented to the trainee at the training time, by which the work voice separately stored in the storage 402 or the like can be accessed.

The position transition indicates a transition of the position coordinate of the feature point of the target part. The model includes the name of the 3D model file including the three-dimensional shape information of the training target device, by which the 3D model file separately stored in the storage 402 or the like can be accessed.

Existing training content stored in the training content database 426 of the training content management server 40 is updated based on the result analyzed by the system management server 30.

Next, the operation sequence of the content presentation system 1 will be described.

Figure 13:
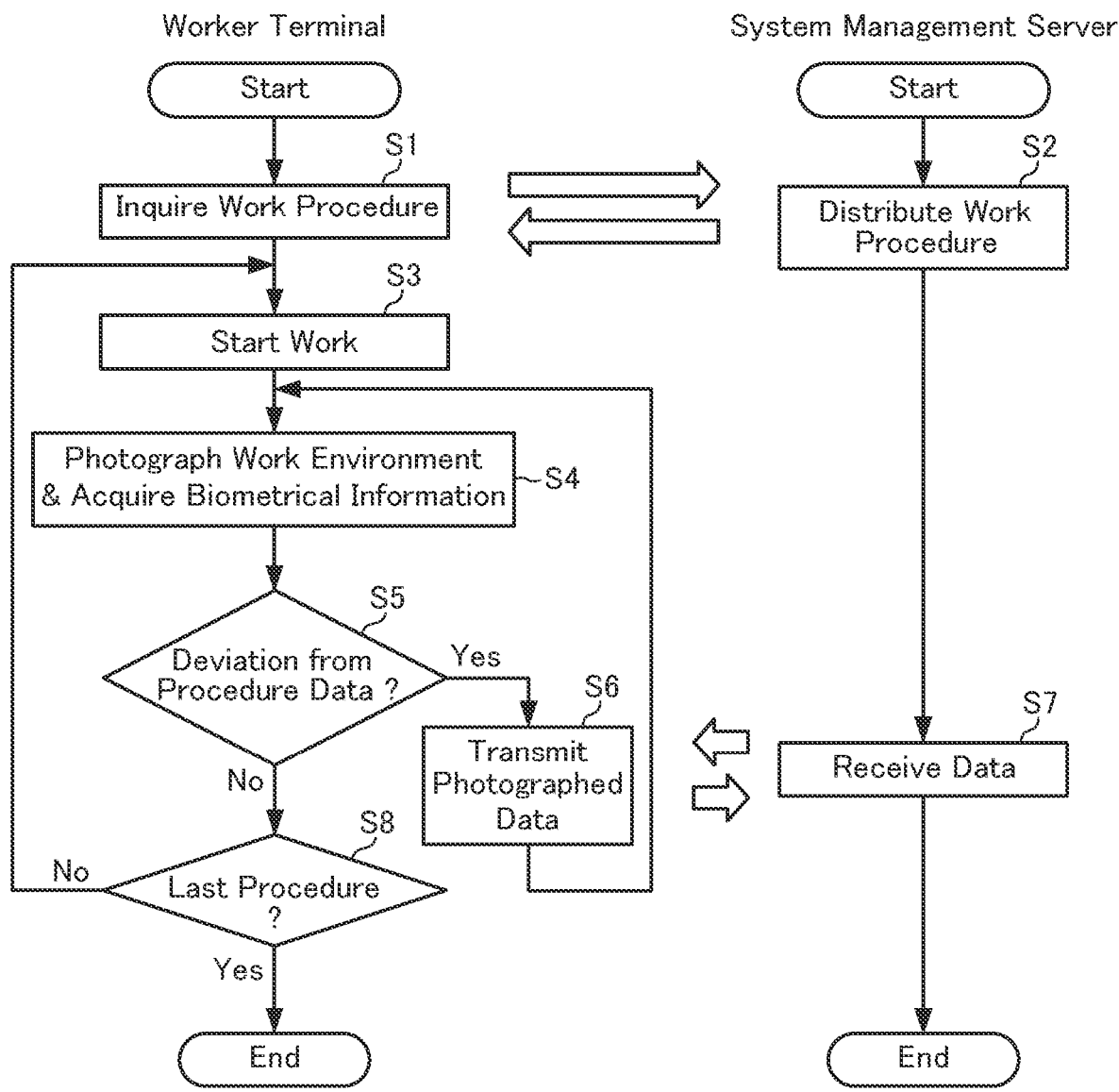
FIG. 13 is a sequence diagram of a site work performed using the content presentation system according to an embodiment of the present invention.

FIG. 13 is a sequence diagram of the on-site work executed using the content presentation system 1.

First, the worker terminal 10 inquires the system management server 30 about the work procedure (S1). Upon receiving the inquiry, the system management server 30 distributes the work procedure information to the worker terminal 10 (S2).

Next, the worker 2 starts and executes the work according to the work procedure (S3), the worker terminal 10 photographs the work environment by a recording unit 105, and acquires biometric information from the biometric sensor attached to the worker 2 (S4).

Next, the on-site determination unit 127 of the worker terminal 10 determines whether or not the three-dimensional operation of the worker 2 is deviated from the reference three-dimensional operation, by the three-dimensional operation detection processing unit 117 (S5). If the determination result is NO, the process proceeds to step S8. If the determination result is YES, the captured image data and the like are transmitted to the system management server 30 (S6). The system management server 30 receives the photographed data and the like transmitted from the worker terminal 10 (S7). This photographed data and the like are used for analysis of failure of work.

In step S8, it is determined whether or not the procedure is the last procedure. If the procedure is not the last procedure (NO), the process returns to step S3 to start and execute the work of the next procedure. In the case of the last procedure (YES), the on-site work is terminated.

Figure 14:
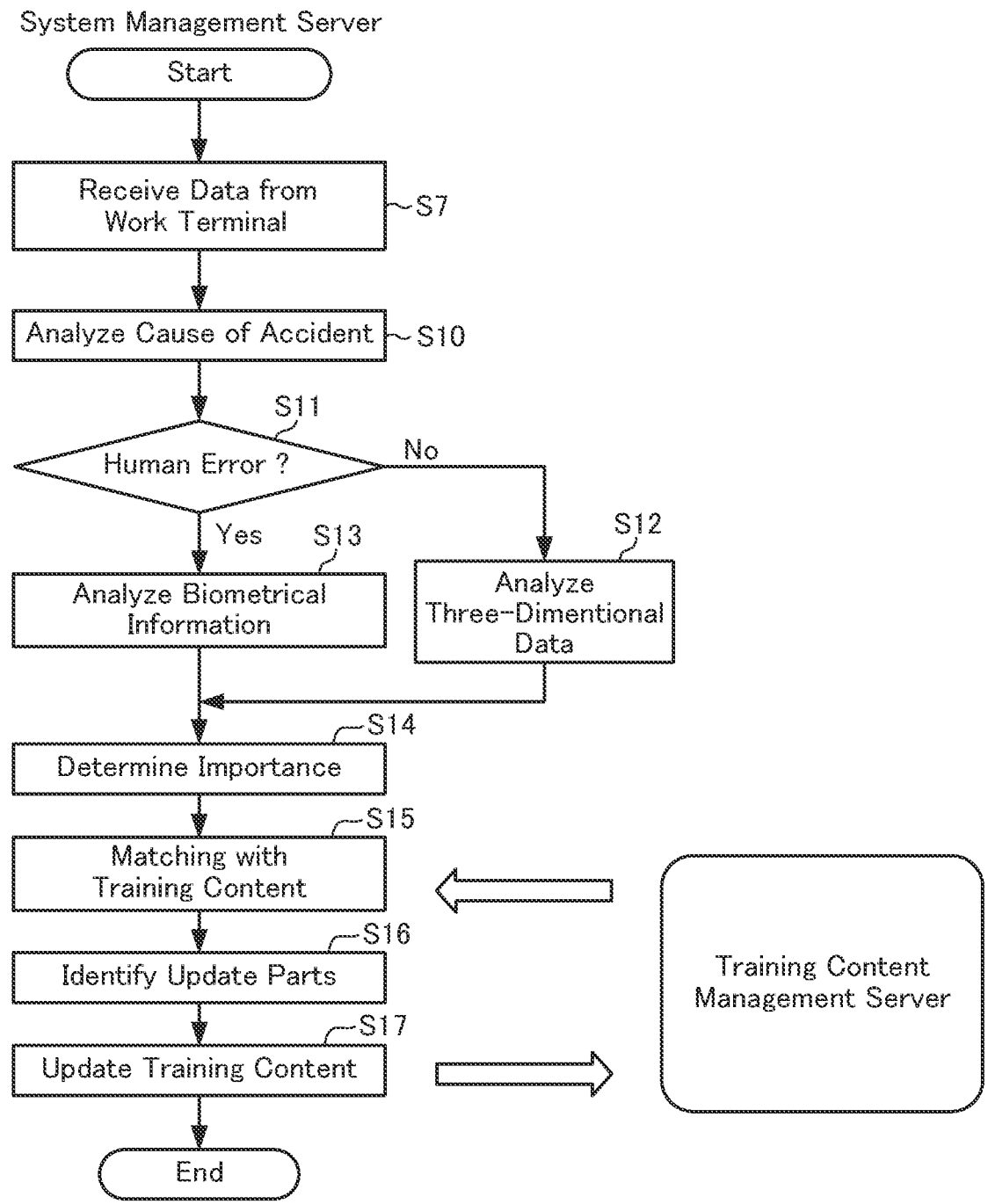
FIG. 14 is a sequence diagram of work analysis processing performed using the content presentation system according to the embodiment of the present invention.

FIG. 14 is a sequence diagram of work analysis processing executed using the content presentation system 1.

First, the system management server 30 receives the photographed data and the like from the worker terminal 10 (S7).

Next, the work analysis unit 335 of the system management server 30 analyzes the cause of the failure (S10).

Next, it is determined whether the cause of the failure is a human error or not (S11). If the cause is a human error (YES), the work record analysis unit 338 analyzes the biometric information (S13). If the cause is not a human error (NO), the work record analysis unit 338 analyzes the three-dimensional data (S12).

Next, the importance of the cause of the failure is determined (S14). The importance may be ranked in advance by numerical values in consideration of the influence level of the result caused by the cause of the failure such as poor physical condition, carelessness, communication mistake, manual error, and the like of the worker.

Next, the training content matching unit 341 matches the training content with the training content stored in the training content management server 40 (S15), and identifies the updated portion (S16).

Next, the training content is updated by the training content creation/update unit 342 (S17). The updated training content is transmitted to the training content management server 40 and stored in the training content database 426.

Figure 15:
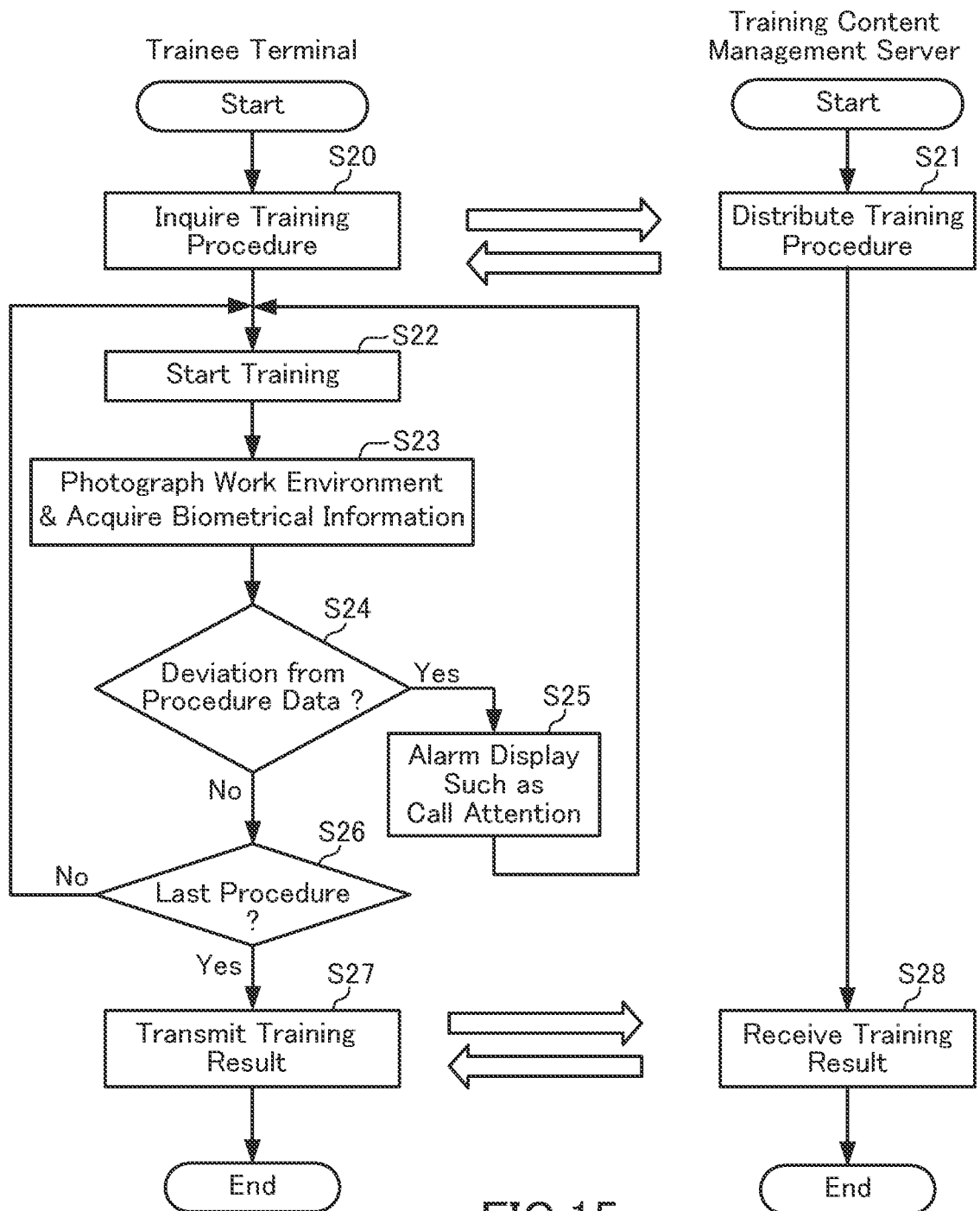
FIG. 15 is a sequence diagram of training performed using the content presentation system according to the embodiment of the present invention.

FIG. 15 is a sequence diagram of training executed using the content presentation system 1.

First, the trainee terminal 20 inquires the training content management server 40 about the training procedure (S20). Upon receiving the inquiry, the training content management server 40 distributes the information of the training procedure to the trainee terminal 20 (S21).

Next, the trainee 3 starts and executes the training work according to the training procedure (S22), and the trainee terminal 20 photographs the working environment by the recording unit 205 and acquires biometric information from the biometric sensor attached to the trainee 3 (S23).

Next, the on-site determination unit 227 of the trainee terminal 20 determines whether or not the three-dimensional operation of the trainee 3 is deviated from the reference three-dimensional operation, by the three-dimensional motion detection processing unit 217 (S24). If the determination result is NO, the process proceeds to step S26. If the result of the determination is YES, an alert display such as calling attention is displayed on the display unit 203 of the trainee terminal 20 (S25), and the process returns to the step S22.

In step S26, it is determined whether or not the procedure is the last procedure. If the procedure is not the last procedure (NO), the process returns to step S22 to start and execute the work of the next procedure. In the case of the last procedure (YES), the information of the training result is transmitted to the training content management server 40 (S27), and the training content management server 40 receives the information of the training result (S28). The information on this training result is used for aggregating the training performance results of the trainee 3.

Next, a content presentation method according to the present embodiment will be described.

Figure 16:
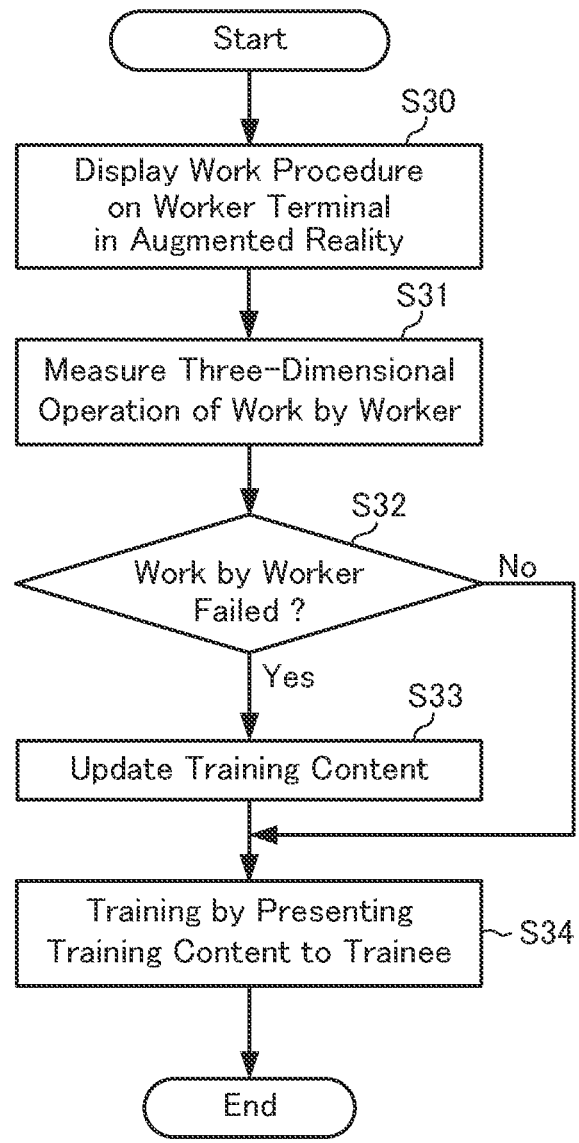
FIG. 16 is a flowchart illustrating a content presentation method according to an embodiment of the present invention.

FIG. 16 is a flowchart of the content presentation method according to the present embodiment.

First, based on the three-dimensional shape information of the work target device 4, the work procedure is displayed on the display unit 103 of the worker terminal 10 by augmented reality (S30).

Next, the three-dimensional operation detection processing section 117 of the worker terminal 10 measures the three-dimensional operation of the worker 2 who executes the work indicated in the work procedure (S31).

Next, the work analysis unit 335 of the system management server 30 determines whether or not the work of the worker 2 has failed (S32). To be specific, when a predetermined body motion of the worker 2 is detected based on the measurement information obtained by measuring the three-dimensional operation of the worker 2, whether or not the work has failed is determined based on the measurement information (three-dimensional reference operation) of the work operation in the specific stage of the work of the model worker, up to the aforementioned body motion.

More specifically, for example, when it is determined by the on-site determination unit 127 of the worker terminal 10 that the three-dimensional operation of the worker 2 deviates by a predetermined value or more from the three-dimensional reference operation, the work analysis unit 335 of the system management server 30 more precisely compares the transition of the position of the feature points of the specific part of the worker 2 with the transition of the position of the feature points of the specific part of the model worker in the identical work, thereby to calculate the operation conformity level. Whether the work has failed or not is determined by comprehensively judging the operation conformity level, the physical condition of the worker 2, suitability of the used tools, elapsed time, and the like.

Next, when it is determined that the work has failed, the training content management unit 340 of the system management server 30 updates the training content so as to suppress the factor of the failure (S33). For example, attention is called on the screen in a failed work procedure. When there is no corresponding training content, a training content is newly created. The updated or created training content is stored in the training content database 426 of the training content management server 40.

The training content management unit 340 may update the training content so as to reflect the specification change information of the work target device 4 and the change information of the work environment.

Next, the training terminal management unit 430 of the training content management server 40 presents the changed training content to the trainee 3, and executes the training of the worker 2 (S34).

According to the above configuration, since the training content is updated so as to suppress the factor of failure when it is determined that the result of the determination is a failure of the work, the failure of the on-site work can be efficiently reflected to the training content used in the training, thereby making it easy to maintain the training content.

Next, an example of a screen display on the display unit 103 of the worker terminal 10 will be described in order to explain the content change.

Figure 17:
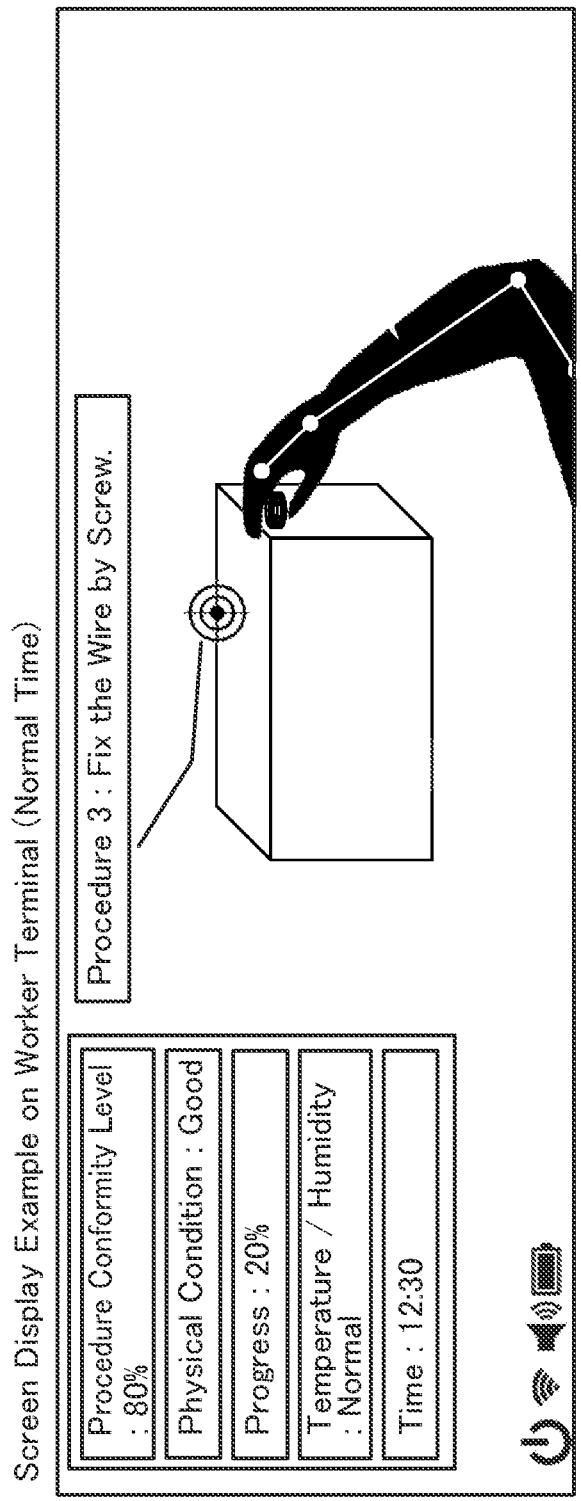
FIG. 17 is an explanatory diagram showing a display example (normal state) of the screen of the worker terminal.

FIG. 17 is an explanatory diagram showing a display example of the screen of the display unit 103 of the worker terminal 10 when the on-site work is normally executed.

On the screen, a procedural display on the upper part of the screen and an environmental information/status display on the left part of the screen are superimposed by augmented reality on the image actually photographing the work site.

Figure 18:
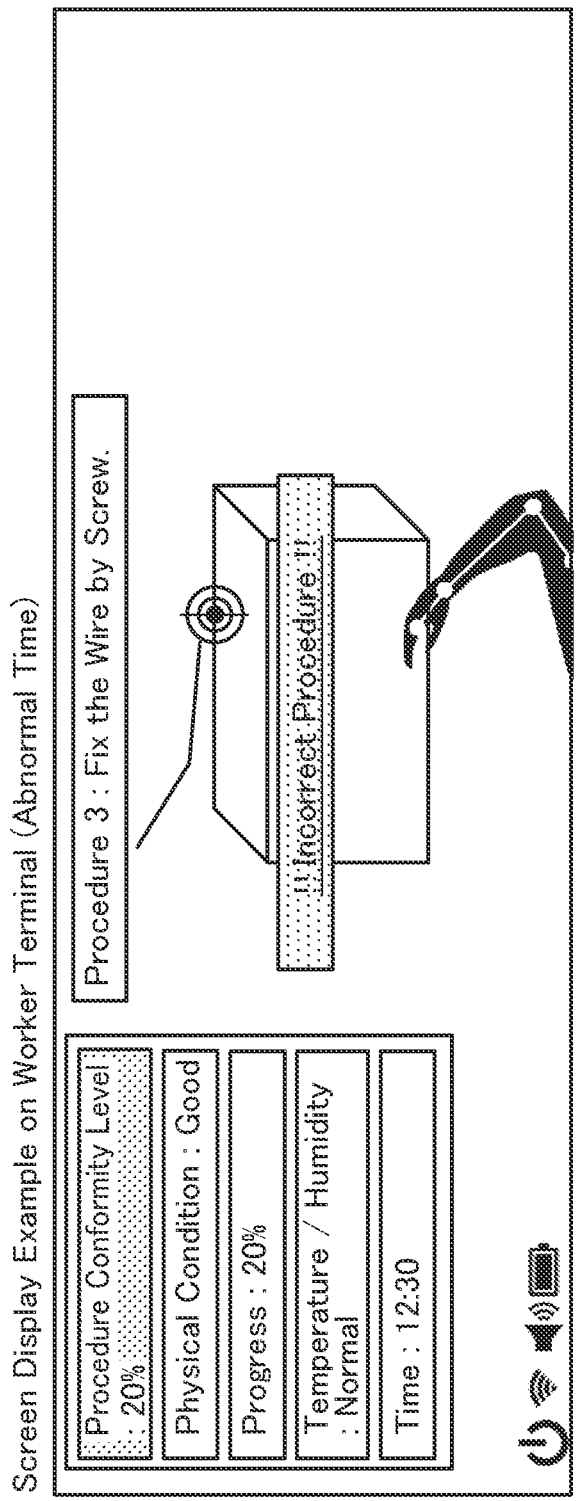
FIG. 18 is an explanatory diagram showing a display example (abnormal state) of a screen of a worker terminal.

FIG. 18 is an explanatory diagram showing an example of screen display of the display unit 103 of the worker terminal 10 at the time of an abnormal operation of the worker 2, for example, at the time when the on-site determination unit 127 of the worker terminal 10 determines that the work operation of the worker 2 deviates from the reference operation.

On the screen, a procedural display on the upper part of the screen, an environmental information/status display on the left part of the screen, and an attention call display on the central part of the screen are superimposed by augmented reality on the image actually photographing the work site. For example, the attention call display is such as "!! Incorrect Procedure !!".

Figure 19:
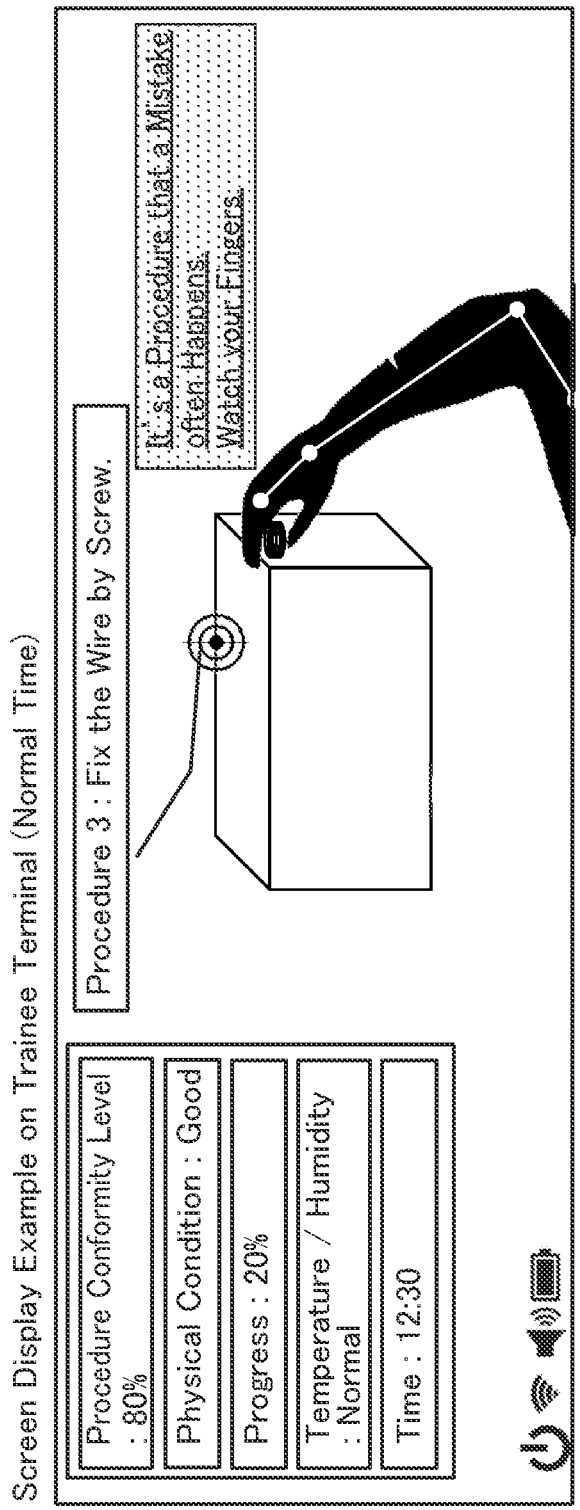
FIG. 19 is an explanatory diagram showing a display example (normal state) of a screen on a trainee terminal.

FIG. 19 is an explanatory diagram showing a display example of the screen of the display unit 203 of the trainee terminal 20 when the training is normally performed.

On the screen, a procedural display on the upper part of the screen, an environmental information/status display on the left part of the screen, and an attention call display on the right part of the screen are superimposed by augmented reality on the image actually photographing in the work site. For example, the attention call display is such as "It's a procedure that a mistake often happens. Watch your fingers.". This attention call display is to reflect the information when the worker 2 failed the work in the on-site work to the training content and to suppress the factor of the failure.

Figure 20:
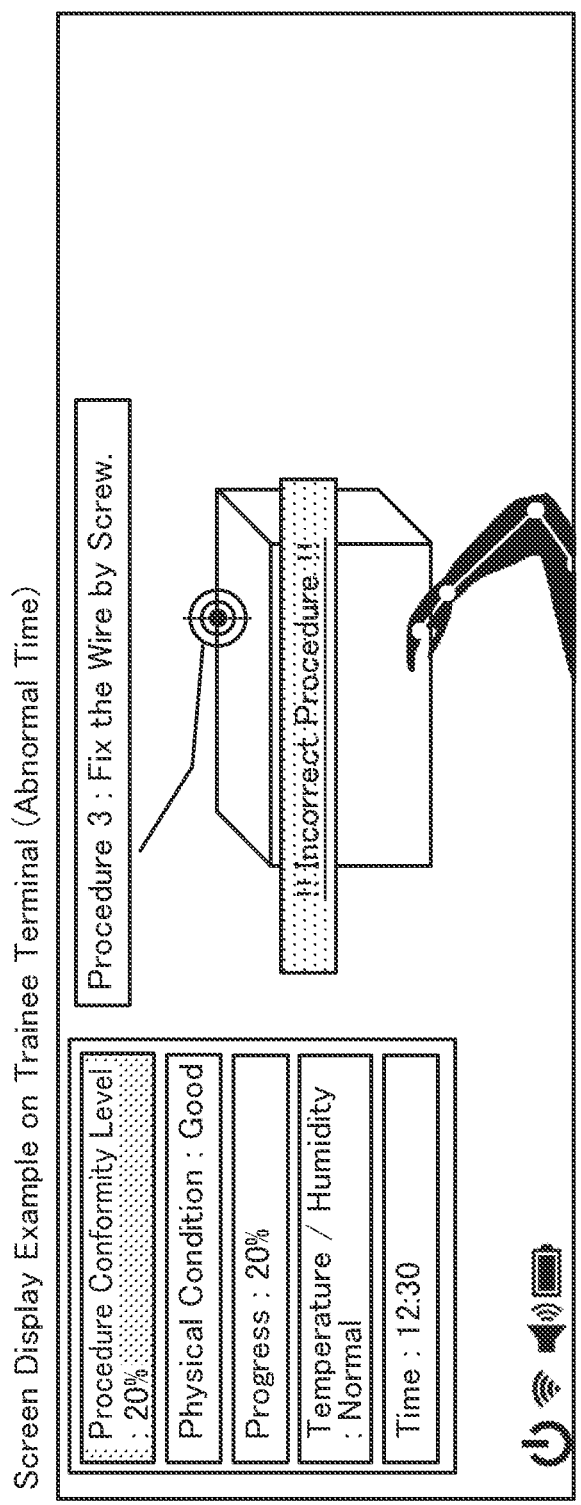
FIG. 20 is an explanatory diagram showing a display example (abnormal state) of the screen on the trainee terminal.

FIG. 20 is an explanatory diagram showing a display example of the screen of the display unit 203 of the trainee terminal 20 when the trainee 3 executes an abnormal operation, for example, when the on-site determination unit 227 of the trainee terminal 20 determines that the work operation of the trainee 3 deviates from the reference operation.

On the screen, a procedure display on the upper part of the screen, an environmental information/status indication on the left part of the screen, and an attention call display on the center part of the screen is superimposed by augmented reality on the image actually photographing the training site. For example, the attention call display is such as "!! Incorrect Procedure !!". Although FIG. 19 and FIG. 20 present the training content by augmented reality, it goes without saying that the training content may be presented by virtual reality.

As described above, when there is a failure in the on-site work, warnings are displayed so as to suppress the factor of the failure at the same work procedure in the same work in the training. Attention calling may be executed by voice in addition to display on the screen or in place of it.

Next, functions and effects will be described.

As described above, in the content presentation system 1 according to the present embodiment, the three-dimensional operation detection processing unit 117 of the worker terminal 10 acquires the three-dimensional operation during the work of the worker 2 at the work site at least as the measurement information of a body motion, the work analysis unit 335 of the system management server 30 analyzes the three-dimensional operation of the worker based on the evaluation reference information for evaluating the work operation based on the measurement information of the work operation and determines whether or not the work has failed. Then, when the work is determined to have failed, the training content management unit 340 of the system management server 30 updates or creates the training content so as to suppress the factor of the failure. In other words, the content presentation system 1 according to the present embodiment is a system that enables the work site and the training to cooperate efficiently and organically.

Specifically, when the predetermined body motion of the worker is detected based on the measurement information from the three-dimensional operation detection processing unit 117 of the worker terminal 10, the work analysis unit 335 of the system management server 30 determines whether or not the work has failed based on the measurement information of the work operation of the model worker in the specific stage of the work up to the detected body motion. And, when the work analysis unit 335 determines that the work has failed, the training content management unit 340 of the system management server 30 updates the training content so as to suppress the factor of the failure.

By this configuration, since the training content is updated so as to suppress the factor of failure when it is determined that the result of the determination is a failure of the work, the failure of the on-site work can be efficiently reflected to the training content used in the training, thereby making it easy to maintain the training contents.

The content presentation system 1 according to the present embodiment is so configured that the work analysis unit 335 of the system management server 30 compares the measurement information of the work operation in accordance with the work procedure of the worker 2 from the three-dimensional operation detection processing unit 117 of the worker terminal 10 with the measurement information of the work operation of the model worker, thereby to determine the conformity level of the both work operations, and the training content management unit 340 of the system management server 30 updates the training content so as to increase the conformity level according to the determination result.

By this configuration, it is possible to update the training content so that the trainee 3 is effectively taught the work operation of the model worker.

In addition, the content presentation system 1 according to the present embodiment is so configured that, when it is determined that the conformity level is equal to or less than the predetermined value for the work operation in the specific stage, the work analysis unit 335 of the system management server 30 determines whether or not the work has failed based on the measurement information including the three-dimensional transition of the specific part of the worker 3 corresponding to the work operation in the specific stage and the work time.

By this configuration, it is possible to reliably detect the failure of the work of the worker, thereby making it possible to efficiently reflect the failure of the work of the worker to the training content.

Further, the content presentation system 1 according to the present embodiment includes the worker terminal 10 used by the worker, the trainee terminal 20 used by the trainee 3, the system management server 30, and the training content management server 40, which are connected through the network.

By this configuration, even when the work site and the training site are remote from each other, it is possible to efficiently reflect the work failure of the worker 2 to the training content.

INDUSTRIAL APPLICABILITY

As described above, the present invention makes it possible to efficiently reflect failures and the like occurring in the on-site work to the training content, has an effect that the maintenance of the training contents is easy, and is useful in content presentation systems and content presentation methods in general.

EXPLANATION OF REFERENCE NUMERALS

1 Content Presentation System
10 Worker Terminal
20 Trainee Terminal
30 System Management Server (Management Server)
40 Training Content Management Server (Management Server)
117 Three-dimensional Operation Detection Processing Unit (Motion Measuring Device)
330 Work Terminal Management Unit (Second Content Output Device)
335 Work Analysis Unit (Determination Device)
340 Training Content Management Unit (Content Creation Device)
430 Training Terminal Management Unit (First Content Output Device)

The invention claimed is:

1. A content presentation system comprising:
a first device having a storage unit that stores a training content, and an output unit that outputs the training content so that the training content can be presented to a trainee, the training content including three-dimensional shape information of a work target device and being created based on a work procedure;
a trainee terminal that receives the training content from the first device and presents the training content to the trainee, the trainee terminal being used by the trainee at a time of training in a training site;
a second device that outputs a work content including the work procedure so that the work content can be presented to a worker based on the three-dimensional shape information of the work target device; and
a worker terminal that receives the work content from the second device and presents the work content to the worker, the worker terminal being used by the worker at the time of working in a work site;
wherein the worker terminal comprises a processor that performs a tool recognition process to acquire a work video of the worker and recognize a tool being used by the worker at the work site;
the second device comprises a second processor that performs:
a determination process to determine whether or not the tool being used by the worker is suitable for the work at a specific stage during the work based on an information about a work tool recognized by a tool recognition device and determine success or failure of the work based on a suitability of the tool; and a content creation process to create and update the training content and the work content based on a determination result of the determination process, wherein when the determination result is determined to be a failure of the work by the determination process, the second processor identifies a portion of the training content corresponding to the specific stage in the work procedure and updates the portion of the training content so as to suppress a factor of the failure and updates the work content to include a display of attention calling.

2. The content presentation system according to claim 1, further comprising a biometric sensor that acquires biometric information of the worker, wherein in the determination process, the second processor determines success or failure of the work based on the biometric information, in addition to the information about the work tool recognized by the tool recognition device.

3. The content presentation system according to claim 1, further comprising an operation measurement device that acquires a three-dimensional operation during a work of the worker in the work site at least as a measurement information of a body motion, wherein in the determination process, the second processor determines success or failure of the work based on the measurement information, in addition to the information about the work tool recognized by the tool recognition device.

4. The content presentation system according to claim 3, wherein in the determination process, the second processor compares the measurement information of the work by the worker according to the work procedure from a work operation measurement device with the measurement information of the work by a model worker, and determines a conformity level of a plurality of work operations, and in the content creation process, the second processor updates the training content in accordance with the determination result, so as to increase the conformity level.

5. The content presentation system according to claim 4, wherein when the conformity level of a work operation in the specific stage is determined to be equal to or less than a predetermined value, the second processor, in the determination process, determines whether or not the work has failed based on the measurement information including a three-dimensional transition of a specific part of the worker corresponding to the work operation in the specific stage and a work time.

6. The content presentation system according to claim 1, further comprising a management server, wherein the first device and the second device are constituted by the management server which is connected to the worker terminal through a network.

7. A content presentation method including:

a first content output step to store a training content, and to output the training content so that the training content can be presented to a trainee, the training content including three-dimensional shape information of a work target device and being created based on a work procedure;

a step to receive the training content outputted in the first content output step and present the training content to the trainee by a trainee terminal that is used by the trainee at a time of training in a training site;

a second content output step to output a work content including the work procedure so that the work content can be presented to a worker based on the three-dimensional shape information of the work target device;

a step to receive the work content outputted in the second content output step and present the work content to the worker by a worker terminal that is used by the worker at the time of working in a work site;

a tool recognition step to acquire a work video of the worker and recognize a tool being used by the worker at the work site;

a determination step to determine whether or not the tool being used by the worker is suitable for the work at a specific stage during the work based on an information about a work tool recognized by the tool recognition step and determine success or failure of the work based on a suitability of the tool; and a content creation step to create and update the training content and the work content based on a determination result of the determination step, wherein in the content creation step or the first content output step, when the determination result is determined to be a failure of the work in the determination step, a portion of the training content corresponding to the specific stage in the work procedure is identified and the portion of the training content is updated so as to suppress a factor of the failure and the work content is updated to include a display of attention calling.

* * * * *